US009783162B2

(12) United States Patent
Hoyos et al.

(10) Patent No.: US 9,783,162 B2
(45) Date of Patent: *Oct. 10, 2017

(54) SYSTEM AND METHOD FOR FACILITATING USER ACCESS TO VEHICLES BASED ON BIOMETRIC INFORMATION

(71) Applicant: VERIDIUM IP LIMITED, London (GB)

(72) Inventors: Hector Hoyos, New York, NY (US); Jason Braverman, Toronto (CA); Geoffrey Xiao, Lexington, MA (US); Jonathan Francis Mather, Oxford (GB); Scott Streit, Baltimore, MD (US)

(73) Assignee: VERIDIUM IP LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,141

(22) Filed: Jan. 5, 2017

(65) Prior Publication Data

US 2017/0174180 A1    Jun. 22, 2017

Related U.S. Application Data

(63) Continuation of application No. 14/737,344, filed on Jun. 11, 2015, now Pat. No. 9,563,998.

(60) Provisional application No. 62/010,880, filed on Jun. 11, 2014.

(51) Int. Cl.
*G05B 19/00* (2006.01)
*G05B 23/00* (2006.01)
(Continued)

(52) U.S. Cl.
CPC ............ *B60R 25/25* (2013.01); *B60R 25/241* (2013.01); *B60R 2325/106* (2013.01); *B60R 2325/205* (2013.01)

(58) Field of Classification Search
CPC . B60R 25/25; B60R 25/241; B60R 2325/106; B60R 2325/205
See application file for complete search history.

(56) References Cited

U.S. PATENT DOCUMENTS 9,162,648 B1 * 10/2015 Weng ...................... B60R 25/24
9,288,270 B1 * 3/2016 Penilla ................... H04W 4/003
(Continued)

OTHER PUBLICATIONS

International Search Report and Written Opinion for International Patent Application No. PCT/US2015/035415 dated Oct. 5, 2015. 19 pages.

*Primary Examiner* — Erin File
(74) *Attorney, Agent, or Firm* — Leason Ellis LLP

(57) ABSTRACT

Systems and methods are provided for authorizing a user to access an access-controlled environment. The system includes a system server platform that communicates with mobile devices (e.g., smartphones) and on-board vehicle computing devices accessed by users. The embodiments enable a series of operations whereby a user accessing a vehicle is prompted to biometrically authenticate using the user's smartphone or on-board vehicle computer. In addition, the system can further authorize the user and electronically facilitate access to the vehicle as well as perform other authorized operations relating to the use of the vehicle. In addition the vehicle access system integrates with various computing devices and computer-based services accessible to the user. The systems and methods also facilitate active monitoring of the vehicle occupants and environmental conditions using optical sensors and the like so as to enhance security, convenience and safety of the occupants during use of the vehicle.

21 Claims, 9 Drawing Sheets

(51) Int. Cl.
  *G06F 7/00*     (2006.01)
  *G06F 7/04*     (2006.01)
  *G06K 19/00*    (2006.01)
  *G08B 29/00*    (2006.01)
  *G08C 19/00*    (2006.01)
  *H04B 1/00*     (2006.01)
  *H04B 3/00*     (2006.01)
  *H04Q 1/00*     (2006.01)
  *H04Q 9/00*     (2006.01)
  *B60R 25/25*    (2013.01)
  *B60R 25/24*    (2013.01)

(56) References Cited

U.S. PATENT DOCUMENTS

| | | |
|---|---|---|
| 2006/0293892 A1 | 12/2006 | Pathuel |
| 2008/0266054 A1 | 10/2008 | Crank |
| 2009/0240427 A1* | 9/2009 | Siereveld ............ G01C 21/3469 701/533 |
| 2010/0222939 A1* | 9/2010 | Namburu ............ G07C 9/00111 701/2 |
| 2010/0274631 A1* | 10/2010 | McFall ............... G06Q 30/0203 705/7.32 |
| 2011/0231310 A1 | 9/2011 | Roberts et al. |
| 2014/0094987 A1 | 4/2014 | Healey et al. |
| 2014/0247348 A1* | 9/2014 | Moore, Jr. ............... G06F 17/00 348/148 |
| 2014/0277869 A1* | 9/2014 | King ................... B60H 1/00278 701/22 |
| 2014/0309790 A1* | 10/2014 | Ricci .................... H04W 48/04 700/276 |
| 2015/0112512 A1* | 4/2015 | Fan ......................... H04L 67/12 701/2 |
| 2015/0210287 A1* | 7/2015 | Penilla ................. B60W 40/08 701/49 |
| 2016/0246526 A1* | 8/2016 | Ricci ..................... G06F 3/0622 |

* cited by examiner

SYSTEM AND METHOD FOR FACILITATING USER ACCESS TO VEHICLES BASED ON BIOMETRIC INFORMATION

CROSS-REFERENCE TO RELATED APPLICATIONS

The present application is a continuation of U.S. Pat. No. 9,563,998, entitled SYSTEM AND METHOD FOR FACILITATING USER ACCESS TO VEHICLES BASED ON BIOMETRIC INFORMATION, filed on Jun. 11, 2015 and issued on Feb. 7, 2017, which is based on and claims priority to U.S. Patent Application Ser. No. 62/010,880, entitled "SYSTEM AND METHOD FOR FACILITATING USER ACCESS TO AUTOMOBILES BASED ON BIOMETRIC INFORMATION" filed Jun. 11, 2014, the contents of each of which is hereby incorporated by reference as if set forth expressly in its respective entirety herein.

TECHNICAL FIELD OF THE INVENTION

The present invention relates to systems and methods for facilitating user access to vehicles, in particular, systems and methods for facilitating user access to vehicles based on user biometric information.

BACKGROUND OF THE INVENTION

Existing vehicles, even the most expensive kind with every option, have no idea who its owner is. The car, only "knows" in the most basic sense, that someone is driving the car and that someone is sitting in the front seat. Cars might also know that a particular key-fob is being used to access the car. Generally speaking, cars are very smart at managing themselves, but have no awareness about who is in the car. Current technology advancement is focused on self-driving cars that have some awareness of the exterior world. However no cars are configured to have an awareness of the driver's or passengers or takes informed action based on an identification of the occupants of the car and active monitoring of the occupants.

Thus, there is a need for vehicles that are owner or user aware. Thus there is a need for vehicle based systems that can identify the user by name and face using conventional mobile-device technology. There is also a need for securely integrating existing vehicle based systems with other user devices and networked systems and services associated with the identified user. Moreover there is a need for such a vehicle based system that, through machine learning, can identify user habits and preferences. Further, there is a need for a vehicle based system that can monitor use of the vehicle and the users during such use of the vehicle. Further there is a need for a vehicle based system that utilizes the foregoing to provide additional safety, security, and user convenience related assistance and services that aid the user in his daily life.

The present invention addresses these and other considerations.

SUMMARY OF THE INVENTION

In accordance with one or more embodiments of the present application, disclosed herein is a method for authorizing a user to access a vehicle. The method includes accessing, by the computing device, a computer readable storage medium that includes: a plurality of user profiles that are each associated with a respective user and a respective mobile device, a plurality of vehicle profiles that are each associated with a respective vehicle having a respective on-board computer, and permissions associated with respective user profiles in relation to respective vehicle profiles. The permissions govern access by the respective users to the respective vehicles. The method also includes receiving, by the computing device over a network from a mobile device, an authorization request including identification information associated with a user and access information identifying the vehicle. The method also includes authorizing the user access to the vehicle. The authorization step includes identifying one or more permissions that is associated with the user profile and the vehicle profile, and verifying based on the one or more permissions, that the user is authorized to access the vehicle. The method also includes creating, by the computing device in the storage, an access record concerning the authorized access and transmitting an authorization notification that facilitates the user access to the vehicle over a communications network to a remote computing device associated with the vehicle.

According to another aspect of the invention, a method for authorizing a user to access a vehicle is provided. The method includes accessing, by the computing device, a computer readable storage medium that includes: a plurality of user profiles that are each associated with a respective user and a respective mobile device, a plurality of vehicle profiles that are each associated with a respective vehicle having a respective on-board computer, and permissions associated with respective user profiles in relation to respective vehicle profiles. The permissions govern access by the respective users to the respective vehicles. The method also includes receiving, by the computing device over a network from a mobile device, an authorization request including identification information associated with a user and a mobile device, a biometric authentication status and access information identifying the vehicle. The method also includes authorizing the user access to the vehicle. The authorizing step comprises: determining that the received identification information corresponds to a user profile among the plurality of user profiles stored in the storage. The authorizing step also includes determining that the identified vehicle corresponds to a vehicle profile among the plurality of vehicle profiles stored in the storage. The authorizing step also includes determining based on the received biometric authentication status, that the user has been biometrically authenticated by the mobile device. The authorizing step also includes identifying one or more permissions, among the permissions, that is associated with the user profile and the vehicle profile, and verifying, by the computing device based on the one or more permissions, that the user is authorized to access the vehicle. The method also includes creating, by the computing device in the storage, an access record concerning the authorized access and transmitting an authorization notification that facilitates the user access to the vehicle over a communications network to a remote computing device associated with the vehicle. receiving, by the computing device over a network from a mobile device, an authorization request comprising: identification information associated with a user and a mobile device, a biometric authentication status and access information identifying the vehicle;

Other features and advantages of the present invention will become apparent from the following description of the invention that refers to the accompanying drawings.

DETAILED DESCRIPTION OF CERTAIN EMBODIMENTS OF THE INVENTION

By way of example only and for the purpose of overview and introduction, embodiments of the present invention are described below which concern a system and method for authorizing a user's access to an access-controlled environment (ACE), in particular, a vehicle, such as an automobile, based on biometric authentication of the user.

The systems and methods disclosed herein facilitate a user's physical access to the vehicle based on, among other things, user authentication based on the user's biometric information. Similarly, the disclosed embodiments provide authorized user access to various computer-based features and functionality relating to the vehicle and operation of the vehicle. As further described herein, the term "access" encompasses one or more user's physical access to a vehicle (e.g., entering the interior of the vehicle), use of the vehicle (e.g., driving the vehicle), interacting with vehicle features and functions, directly or indirectly using a user computing device (e.g., adjusting various features and settings relating to the vehicle operation, regulating the use of the vehicle by others and the like). The user access also includes using features, functions and services provided by a computing device that is integrated into the vehicle, for instance, using the on-board computer to access, via a communications network, other access controlled environments such as subscription based services (e.g., music accounts, navigation, payment accounts) to perform electronic transactions while using the vehicle.

The systems and methods disclosed herein provide the infrastructure to configure a car to be owner aware. More specifically, the on-board computer can identify the owner by name and face before accessing and while using the vehicle. In addition, using optical sensors and other sensors placed throughout the vehicle, the system is further configured to actively monitor the user based on biometrics, monitor the vehicle and the surrounding environment during use. Accordingly, the on-board computer can, through machine learning, learn user characteristics, habits and preferences. The system can also, using the biometric user information, detect abnormal user behavior, emergency conditions and the like. In response the system can adjust the operation of the vehicle accordingly or provide notifications and alerts to the appropriate recipients. The machine learning can be further enhanced and informed by integration of the on-board computer with other user devices and networked systems and services associated with the user. Accordingly, through biometrics based user identification and monitoring, environmental monitoring and machine learning, the system can provide safety, security and convenience related assistance and services to aid the user in his daily life.

Figure 1:
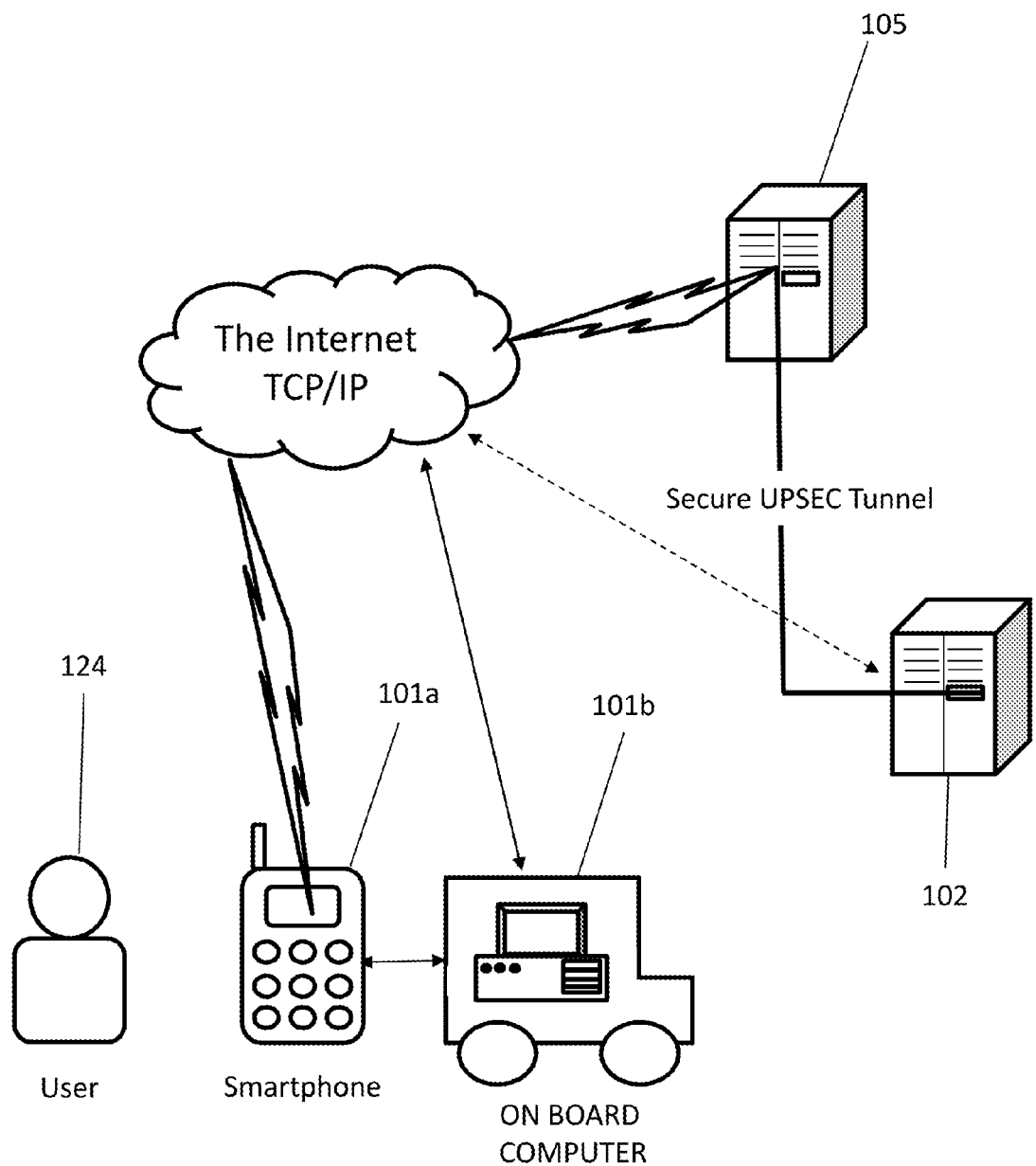
FIG. 1 is a high-level diagram of a system for authorizing access to a vehicle in accordance with at least one embodiment disclosed herein.

As shown in FIG. 1, the system for authorizing a user to access a vehicle 100 can include a networked remote system server platform 100 that communicates with networked servers, and user-facing computing devices ("user devices") including, for example and without limitation, fixed computers, on-board vehicle computing devices ("on-board computer" 101b), and mobile devices 101a such as laptops, tablets and smartphones, to facilitate biometric authentication of the user and authorizing the access requested by the user based on rules and permissions associated with respective vehicles and/or respective users.

Authentication includes capturing biometric information of the user, extracting unique features and encoding the features as an identifier. Authentication can be performed by various user-facing devices, either alone or in coordination with the system server. In some implementations, the user can be biometrically authenticated by the user's preregistered smartphone device. In addition or alternatively, the user can be authenticated by the on-board computer. During authentication by the on-board computer, for example, biometric information can be captured using one or more sensors that are located in or around the vehicle and that are operatively connected to the on-board computer. Using the captured biometrics, the on-board computing device can perform the biometric authentication of the user. In addition to biometric authentication, the on-board computer can, in conjunction with the remote system servers, authorize the user to access the vehicle.

If user is successfully authenticated and authorized to access the vehicle, the system for authorizing a user to access a vehicle 100 can facilitate the user's physical access. For example, the remote system server 105 can transmit an authorization notification to the on-board computer 101b. Moreover, after a user has been authenticated, the system can also instruct the on-board computer to perform other operations such as starting the vehicle and the like. In this exemplary manner the system can facilitate a user's physical access to the vehicle, as well as provide physical or electronic access to and control over other computer-controlled functions of the vehicle and services available through the on-board computer.

In addition, the systems and methods disclosed herein further provides biometrically secured integration of the on-board computer 101b with other enrolled user computing devices, such as a user's mobile devices 101a (also referred to as a smartphone) or desktop computer, such that various user device can be used to interact with the on-board computer, manage access to the vehicle and other computer-controlled features of the vehicle. Similarly, such integration further facilitates secure sharing of the vehicle, vehicle-based functionality and services and information relating to the user and the use of the vehicle across the various devices that comprise the system 100. Moreover, the systems and methods for secure biometrics-based user authentication can be configured to authenticate/authorize the user's access other access-controlled environments (e.g., remote, networked computing devices and the services that they provide via the on-board computer or a user's personal computing devices).

The systems and methods of the present application provide significant convenience for users as a function of biometrics-based access management and increased security by supplementing or eliminating the need for physical keys, passwords and/or devices dedicated to storing user account information, such as cards or token key-fobs and the like. Although the disclosed embodiments are described in the context of providing access to a vehicle and computer access-controlled features and functionality relating to the use of the vehicle, many of the principles disclosed herein are similarly applicable to facilitating access to virtually any type of system requiring user authentication/authorization, such as for example website access, physical access control, user role determination, group identification, automation, password management, or other access controlled physical and virtual environments.

The systems and methods disclosed herein provide a distributed infrastructure of computing devices including a back-end system server that is configured to coordinate biometrics-based identity assertion and access management using various types of user-facing devices. By way of non-limiting example, exemplary systems and methods for biometrics based user authentication are more fully described in co-pending and commonly assigned U.S. patent application Ser. No. 14/668,352, entitled "SYSTEM AND METHOD FOR AUTHORIZING ACCESS TO ACCESS CONTROLLED ENVIRONMENTS" filed Mar. 25, 2015, which is hereby incorporated by reference as if fully disclosed in its entirety herein.

According to an aspect of the subject application, capturing images for the purpose of identifying a user based on biometric features can be performed using commercially available digital cameras. For example, the biometric authentication platform can include user devices that are configured to, using an associated camera device, capture a user's biometric information and authenticate the user based on biometrics. In one or more implementations, the biometric authentication platform combines facial recognition technology with iris and periocular recognition technology to facilitate biometric authentication of a user. However, it can be appreciated that any combination of biometrics can be used, for example, face, Iris, periocular, or even voice, vein pattern etc. In addition, biometric authentication can also include "liveness" detection systems to verify that a "real person" is trying to access the system and/or complete a transaction.

In one or more implementations, the exemplary systems can also implement Biometric Open Protocol Standards (BOPS). As used herein, the term "BOPS" generally encompasses rules governing secure communication between various electronic devices and/or the system server, as more fully described in co-pending and commonly assigned U.S. patent application Ser. No. 14/638,787, entitled "SYSTEM AND METHOD FOR BIOMETRIC PROTOCOL STANDARDS" filed Mar. 4, 2015, which is hereby incorporated by reference as if fully disclosed in its entirety herein. In particular, the BOPS protocol can enable a two-way secure socket layer (SSL)/transport layer security (TLS) connection over an encryption mechanism between user devices and the system server, which can also employ an intrusion detection system. Accordingly, the 2-way SSL provides that each communicating user device is verifying the identity of the BOPS server through a certificate provided by the server and also the server is verifying the identity of the user device through a certificate installed on the user device (which is unique for each mobile device and was generated by BOPS during enrollment). Additionally, TLS, in the exemplary implementation, is provided using a 571 bit Elliptic Curve Cipher. Accordingly, the communications can be secured using a 2 way SSL environment where each side is 1024 or 2048 bits in length, and a TLS layer which is 571 bits of ECC encryption, that makes up the transport layer. BOPS can also govern communication between the back-end system server and other remote or cloud based server computing devices.

As used herein, the term "client app" or application refers generally to an application for user-facing computing devices that facilitate integration of the user device with the back-end biometric authentication platform. Using the biometric authentication platform, the client app can configure the user devices to provide users with secure access to systems and services that typically require physical keys, a password and or a username, and the like. Accordingly, the user devices executing the client application, in conjunction with the back-end biometric authentication platform, is capable of replacing all of the items users carry to identify themselves and/or gain authorized access to access controlled environments and perform secure transactions (e.g., Credit Cards, Passports, Drivers License, Access Tokens, keys, etc.)

An exemplary system for authorizing access to a vehicle 100 is shown as a block diagram in FIG. 1. In one arrangement, the system consists of a system server 105, user-facing computing devices including a user mobile device 101a and an on-board vehicle computing device ("on-board computer") 101b. The system 100 can also include one or more remote computing devices 102.

The system server 105 can be practically any computing device and/or data processing apparatus capable of communicating with the user devices and remote computing devices and receiving, transmitting and storing electronic information and processing requests as further described herein. Similarly, the remote computing device 102 can be practically any computing device and/or data processing apparatus capable of communicating with the system server and/or the user devices and receiving, transmitting and storing electronic information and processing requests as further described herein. It should also be understood that the system server and/or remote computing device can be a number of networked or cloud based computing devices.

In some implementations, computing device 102 can represent a networked computing system that provides subscription-based services to users via in-vehicle computing devices, such as the On-Star® service provided by General Motors of Detroit Mich. As would be understood by those in the art, such systems communicate with on-board computing devices over wireless communication networks and provide subscription-based services to the user through such devices including, for example and without limitation, communications, in-vehicle security, hands free calling, turn-by-turn navigation, and remote diagnostics systems. By way of further example, computing device 102 can also represent a computing network associated with an enterprise organization that maintains user accounts and requires authentication of account holders prior to granting access to secure networked environments (e.g., secure website, bank, VPN, payment providers, subscription-based services, and the like) or providing services/conducting transactions for account holders. Accordingly, the networked systems represented by computing device 102 can be configured to maintain user accounts and generally require authentication and authorization of users prior to providing their respective services. The various types of user accounts used to access or interact with such networked systems are referred to herein as transaction accounts.

The user computing devices, including mobile device 101a and on-board computer 101b, can be configured to communicate with one another, the system server 105 and/or remote computing device 102, transmitting electronic information thereto and receiving electronic information therefrom as further described herein. The user devices can also be configured to receive user inputs, as well as facilitate biometric authentication of users by capturing and processing user biometric information, for example, digital images and voice recordings of a user 124.

The mobile device 101a can include but is not limited to a tablet computer, personal digital assistant, cellular telephone, smartphone device or similar mobile computing devices. It can be appreciated that the features and functionality of the mobile device 101a can also be implemented using other user-facing computing devices such as workstations, a personal computers, laptop computers, transaction terminals, and the like. The on-board computer 101b is intended to represent various forms of mobile computing devices that are integrated into a vehicle and that a user can interact with such as vehicle control systems, navigation systems, on-board diagnostic (OBD) systems and the like.

As further described herein, the system for authorizing access to a vehicle 100, facilitates the authentication of a user 124, according to a user's biometric features, in relation to the user's access to a vehicle and/or services relating to the user's access to the vehicle. As previously noted, the user authentication can be performed at least in part, using a user's mobile device 101a and/or the on-board computer 101b.

In some implementations, identification and/or authentication according to a user's biometric features utilizes a user's biometric information in a two stage process. The first stage is referred to as enrollment. In the enrollment stage samples (e.g., images) of appropriate biometric(s) is/are collected from an individual. These samples of biometrics are analyzed and processed to extract features (or characteristics) present in each sample. The set of features present in the biometric of an individual can be encoded to provide a biometric identifier for the person. These identifiers are then stored to complete the enrolment stage. In the second stage the same biometric of the individual is measured. Features from this biometric are extracted just like in the enrollment phase to obtain current biometric information of the user. If the goal is identification, then the current biometric identifier is tested against stored identifiers generated in the first phase (e.g., one-to-many matching). If a match occurs, the identification of the individual is revealed, otherwise identification fails. If the goal is authentication, then the identifier generated in the second stage is compared with the identifier generated in the first stage for the particular person (e.g., one-to-one matching). If a match occurs, authentication is successful, otherwise authentication fails. The captured biometric information can also provide an indication as to whether the user is a live subject. If the goal is determining liveness, the features or characteristics can be analyzed to determine if they are representative of a live subject.

In some implementations, the system server 105 can be configured to securely facilitate identification/authentication of the user's identity (collectively referred to as authentication or identity assertion) without authorizing the user's access to an access-controlled environment or perform an underlying transaction/operation requested by the user. In this manner, the server is not required to retain the user's sensitive transaction account information that is used to authorize access and/or the underlying transaction. Instead, the system server is configured to authorize a user by recognizing one user from another at an appropriate level of security. For example, the system server can be configured to identify a user attempting to access a vehicle and provide the authenticated user identity to an independent system that controls vehicle access and management (e.g., remote computing device 102 operated by the On-Star® service). By way of further example, the system server can be configured to identify a user conducting a financial transaction using the on-board computer (or mobile device) according to the standards required by the payment processor and notify the payment processor's enterprise computing system (e.g., remote computing device 102) that the user has been authenticated. Accordingly, the exemplary systems and methods for authenticating a user can supplement and/or replace the existing enterprise authentication processes by integrating with the existing infrastructure and processes without interfering with established processes for authorizing the access/transactions once a user's identity has been established for security purposes.

However, in addition to identity assertion, the system server 105 can be configured to implement additional security processes, including role gathering and access control, so as to facilitate authorization of a user to access an access-controlled environment. As such, the user authorization process can include identity assertion and can also include authorization by determining whether the user's identity is associated with the requisite permissions to access an access-controlled environment or is associated with one or more transaction accounts that are useable to perform a requested transaction.

In some implementations, the system server 105 can also implement rules governing access to information and/or the transmission of information between a variety of computing devices that users can interact with (e.g., mobile device 101a, on-board computer 101b) and one or more trusted back-end servers (e.g., system server 105 and remote computing device 102). More specifically, the system server 105 can enforce rules governing the user's 124 access to information. The system server can also enforce rules governing the sharing of the user's information with authorized and authenticated third-parties, as defined by the user. For example, the system server can regulate access to a database of information pertaining to the user's 124 use of a vehicle and limit access to that information to other users and third-parties (e.g., monitoring companies) according to rules defined by the user. By way of further example, maintaining a database of information and granting access to the information to an authenticated user according to rules or permissions previously granted to the user.

Exemplary systems and methods for facilitating identity assertion, role gathering, access control and other security functions of the system server 105, including auditing and security assurance and accountability are further described herein and in co-pending and commonly assigned U.S.

patent application Ser. No. 14/638,787, entitled "SYSTEM AND METHOD FOR BIOMETRIC PROTOCOL STANDARDS" filed Mar. 4, 2015, which is hereby incorporated by reference as if fully disclosed in its entirety herein.

It should be noted that while FIG. 1 depicts the system for authorizing access to an access-controlled environment 100 with respect to a mobile device 101a and an on-board computer 101b and a remote computing device 102, it should be understood that any number of such devices can interact with the system in the manner described herein. It should be further understood that, in certain implementations, the referenced devices and machines, and their associated and/or accompanying operations, features, and/or functionalities can be combined or arranged or otherwise employed across any number of such devices and/or machines, such as over a network connection or wired connection or wireless connection. It should also be noted that while FIG. 1 depicts a system 100 with respect to the user 124, it should be understood that any number of users can interact with the system in the manner described herein.

It should also be understood that the exemplary features and functionality described herein in the context of the on-board computer 101b are not so limited and can be implemented using other enabled computing devices, such as, the mobile device 101a, and vice versa.

Figure 2A:
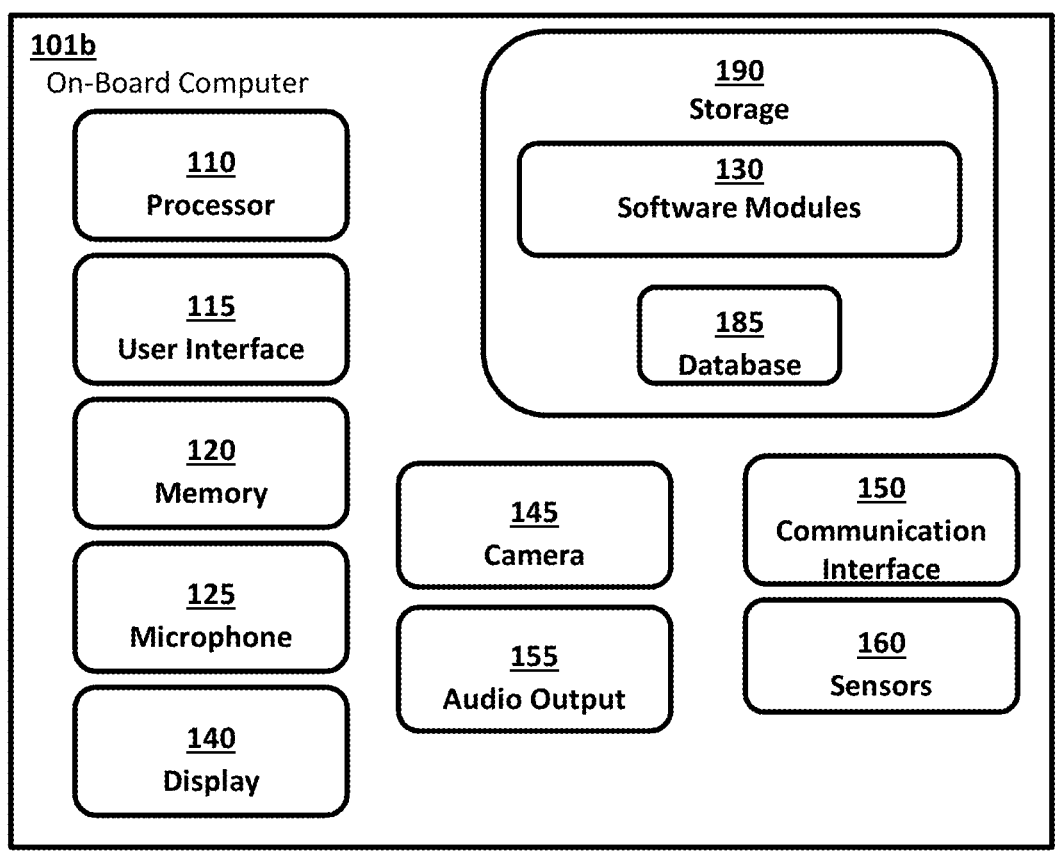
FIG. 2A is a block diagram of a computing device in accordance with at least one embodiment disclosed herein.

FIG. 2A depicts an exemplary block diagram of the on-board computer 101b for use with the system for authorizing access to a vehicle 100. The on-board computer can include various hardware and software components that are located at one or more locations in or on an associated vehicle and that serve to enable operation of the system 100. The components of the on-board computer include one or more processors 110, a memory 120, a microphone 125, a display 140, one or more cameras 145, an audio output 155, a storage 190 and a communication interface 150.

Processor 110 serves to execute the client application including software instructions in the form of executable code that can be loaded into memory 120. Processor 110 can be a number of processors, a central processing unit CPU, a graphics processing unit GPU, a multi-processor core, or any other type of processor, depending on the particular implementation.

Preferably, the memory 120 and/or the storage 190 are accessible by the processor 110, thereby enabling the processor to receive and execute instructions encoded in the memory and/or on the storage so as to cause the on-board computer and its various hardware components to carry out operations for aspects of the systems and methods, as will be described in greater detail below. Memory can be, for example, a random access memory (RAM) or any other suitable volatile or non-volatile computer readable storage medium. In addition, the memory can be fixed or removable. The storage 190 can take various forms, depending on the particular implementation. For example, the storage can contain one or more components or devices such as a hard drive, a flash memory, a rewritable optical disk, a rewritable magnetic tape, or some combination of the above. Storage also can be fixed or removable.

Figure 2B:
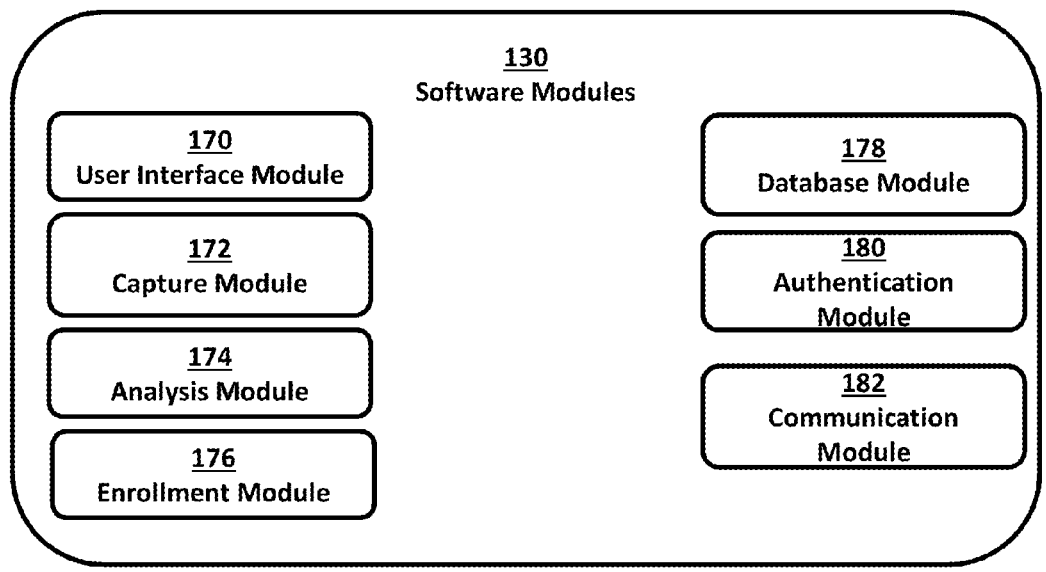
FIG. 2B is a block diagram of computer software modules in accordance with at least one embodiment disclosed herein.
Figure 2C:
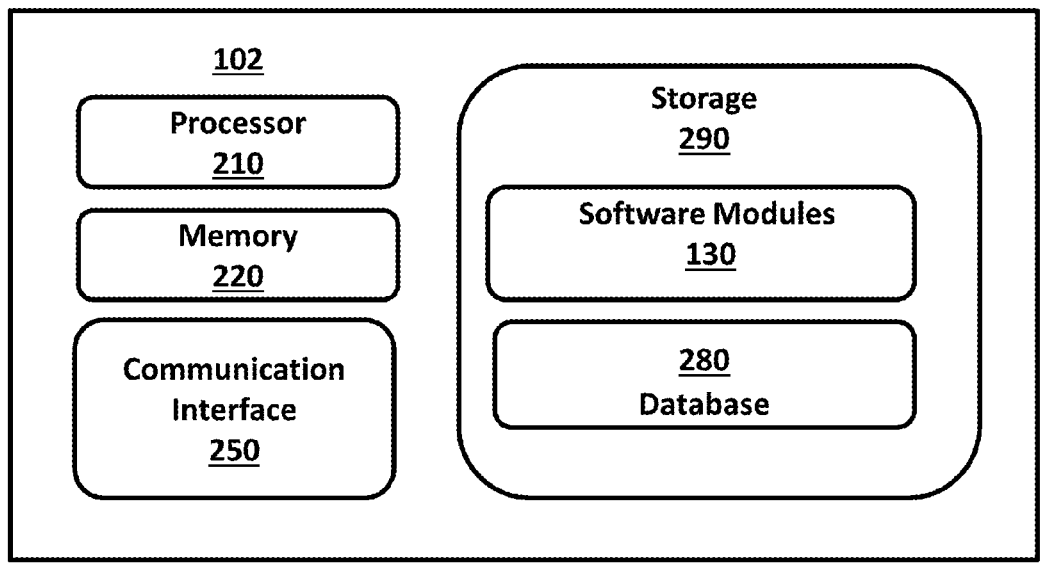
FIG. 2C is a block diagram of a computing device in accordance with at least one embodiment disclosed herein.

One or more software modules 130 are encoded in the storage 190 and/or in the memory 120. The software modules 130 can comprise one or more software programs/applications (referred to as the "client application") having instructions in the form of code. The code can be written in any combination of one or more programming languages and are executable in the processor and, when executing in the processor 110, configure the processor to carry out various operations, as further described herein. As depicted in FIG. 2B, preferably, included among the software modules 130 is a user interface module 170, a biometric capture module 172, an analysis module 174, an enrollment module 176, a database module 178, an authentication module 180 and a communication module 182.

The program code can execute entirely on the on-board computer 101b, as a stand-alone software package, partly on the on-board computer and a remote device, such as, the system server 105. In the latter scenario, the remote computer can be connected to the on-board computer 101b through a network, including a local area network (LAN) or a wide area network (WAN), mobile communications network, cellular network, or the Internet using an Internet Service Provider.

It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It can also be appreciated that the modules are not required to be stored locally by the on-board computer 101b and can be stored in a distributed manner. It should be understood that in some illustrative embodiments, one or more of the software modules 130 can be downloaded over a network to storage 190 from another device or system via communication interface 150 for use within the system authorizing access to a vehicle 100. In addition, it should be noted that other information and/or data relevant to the operation of the present systems and methods (such as database 185) can also be stored on storage.

In some implementations, sensitive user information can be stored on an encrypted datastore that is specifically allocated so as to securely store information collected or generated by the processor executing the secure authentication application. Encryption measures can be used to store the information locally on the storage and to transmit information to remote computing device. For example, such data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256. In addition, data stored on the on-board computer 101b and/or system server 105 can be encrypted using a user's biometric information, liveness information, or device information, or any combination of the foregoing, as an encryption key. For example, using a key derivation function one or more secret keys can be generated from unique user information such as biometric information, such that the key is uniquely associated with the user by virtue of being derived from the user's biometric information. In some implementations, a combination of the foregoing user information can be used to create a complex unique key for the user that can be encrypted using Elliptic Curve Cryptography and stored on the mobile device. In addition, that key can be used to secure the user data stored on the mobile device and/or the system server.

Also preferably stored on storage 190 is database 185. As will be described in greater detail below, the database contains and/or maintains various data items and elements that are utilized throughout the various operations of the system and method for authenticating a user access to a vehicle 100. The information stored in database can include but is not limited to a user profile, as will be described in greater detail herein. It should be noted that although database is depicted as being configured locally to on-board computer 101*b*, in certain implementations the database and the various data elements stored therein can, in addition or alternatively, be located remotely (such as on a remote device 102 or system server 105—not shown) and connected to on-board computer through a network in a manner known to those of ordinary skill in the art.

A user interface 115 is also operatively connected to the processor. The interface can be one or more input or output device(s) such as switch(es), button(s), key(s), a touchscreen, microphone, etc. as would be understood in the art of electronic computing devices and in-vehicle computing devices. User Interface serves to facilitate the capture of commands from the user such as an on-off commands or user information and settings related to operation of the disclosed embodiments. For example, interface serves to facilitate the capture of certain information from the user such as personal user information for enrolling with the system, during user authentication and during normal operation and use of the vehicle as further described herein.

Figure 5A:
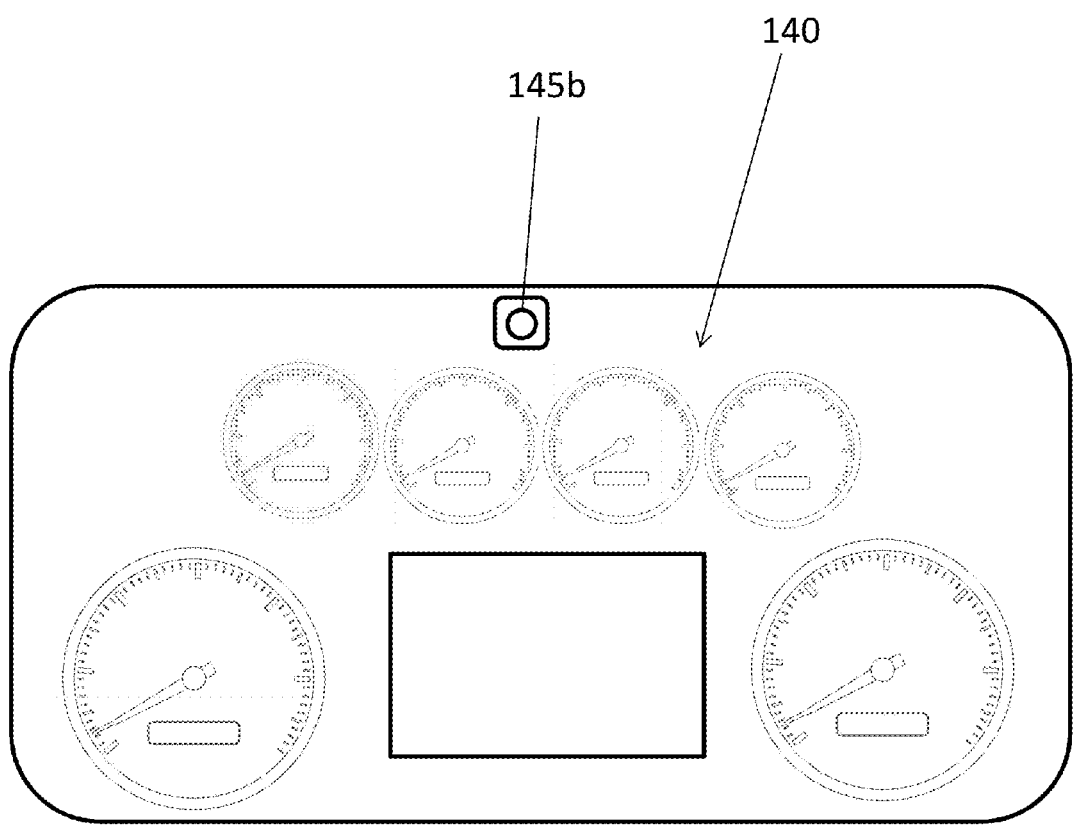
FIG. 5A is an illustration showing an exemplary arrangement of an on-board vehicle computing device in accordance with at least one embodiment disclosed herein.
Figure 5B:
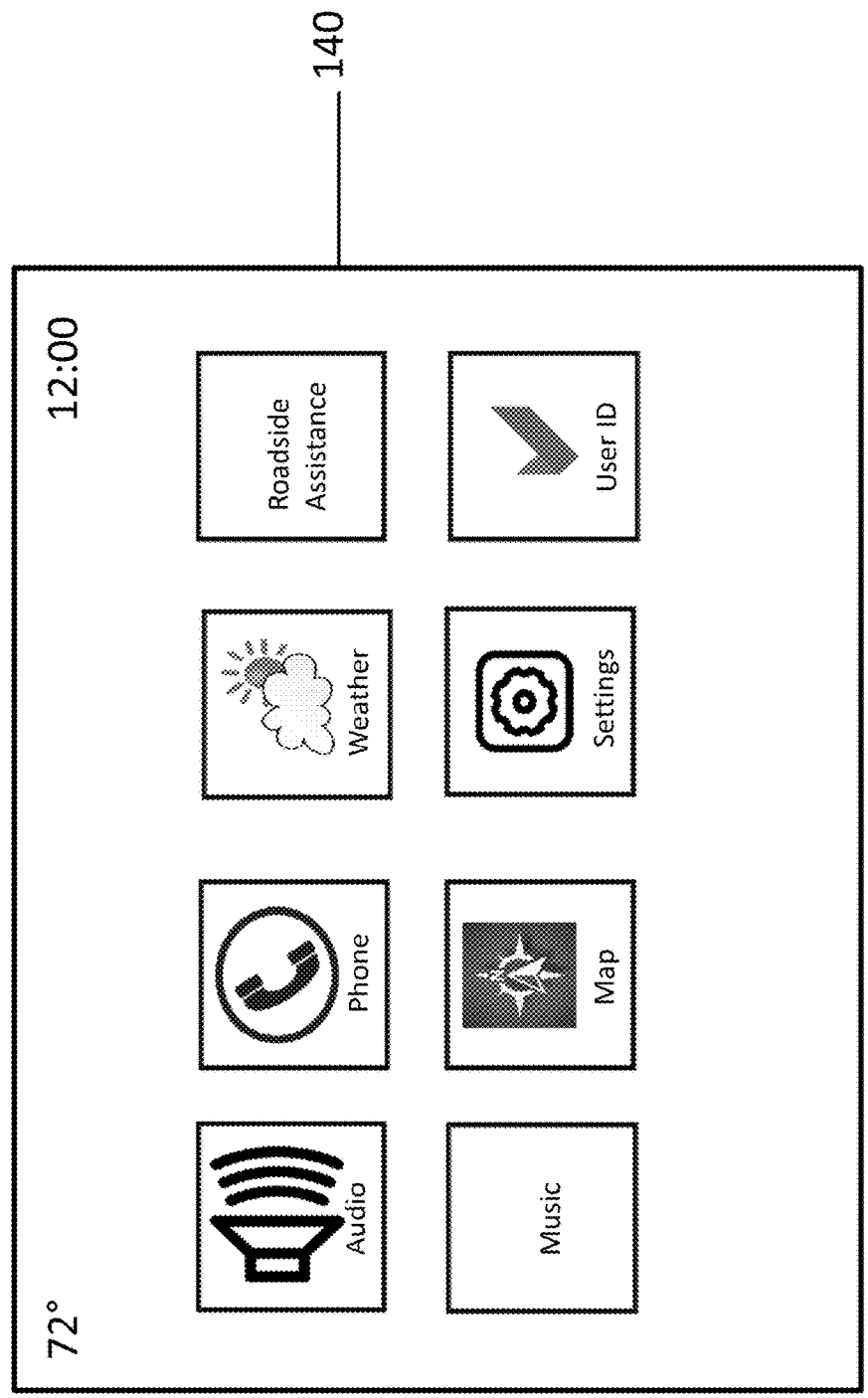
FIG. 5B is an illustration showing an exemplary arrangement of an on-board computing device in accordance with at least one embodiment disclosed herein.

A display 140 can also be operatively connected to the processor 110. The display includes a screen or any other such presentation device which enables the system to instruct or otherwise provide feedback to the user regarding the operation of the vehicle and on-board computer. By way of example, the display can be a digital display such as a dot matrix display or other 2-dimensional display mounted in the gauge cluster of the vehicle as shown in FIG. 5A or a dashboard mounted display as shown in FIG. 5B.

By way of further example, the interface and the display can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the person to interact with the device to enter data, change settings, control functions, etc. So, when the touch screen is touched, user interface communicates this change to processor, and settings can be changed or user entered information can be captured and stored in the memory.

Figure 5C:
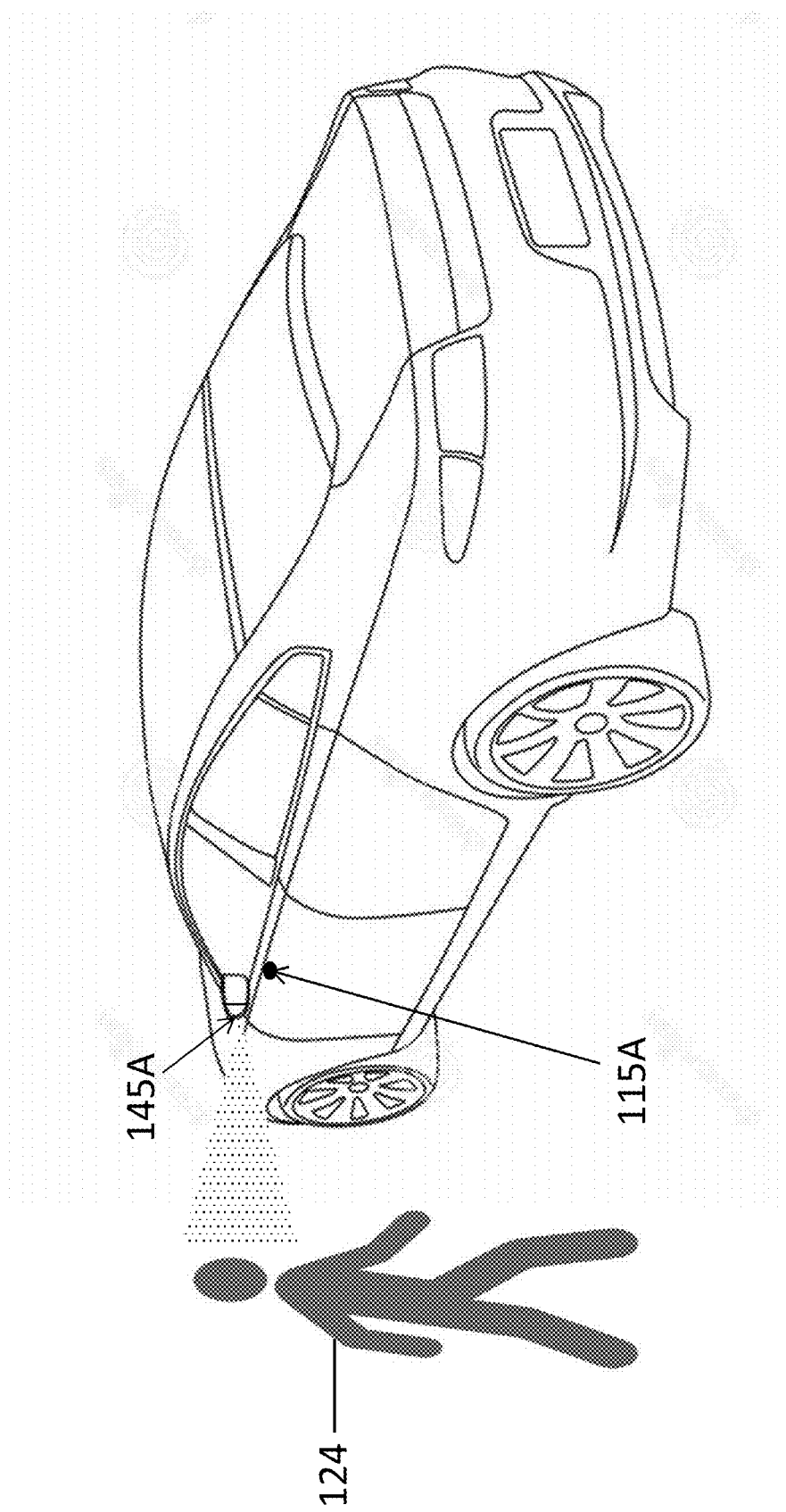
FIG. 5C is an illustration showing an exemplary vehicle including an on-board computing device in accordance with at least one embodiment disclosed herein.

A camera 145 is also operatively connected to the processor 110. The camera serves to facilitate the capture of images of the user. In some implementations, the camera 145 can include one or more visible light cameras (e.g., cameras commonly found on consumer devices and having a sufficient resolution), near infra-red cameras configured to capture NIR images of a user, infra-red cameras and thermal infra-red cameras or a combination of the foregoing. Preferably, at least one camera is positioned in or on the vehicle such that imagery of the user can be captured while the user is outside of the vehicle. For example an exterior mounted camera 145*a* is shown in FIG. 5C as part of the side-view mirror assembly of the vehicle. One or more additional cameras can also be placed at various locations inside the vehicle, for example a camera 145*b* can be placed in the gauge cluster so as to capture imagery of the driver while seated in the driver seat, as shown in FIG. 5A. In addition, one or more cameras can be positioned at various locations of the interior of the vehicle so as to capture imagery of passengers for monitoring or identification as further described herein.

In some implementations, the imagery is captured for the purpose of biometrically identifying/authenticating the user from the images. In addition the cameras can capture imagery for the purpose of monitoring one or more occupants/users of the vehicle including, detecting facial expressions, movement, body-language, monitoring vital signs and other biometric indicators of various conditions. For instance, a thermal IR camera can be used to capture imagery of one or more user's in the vehicle that are useable by the processor to detect core body temperature, heart-rate etc. Visible light or NIR and IR cameras can be used to detect pupil dilation (e.g., for detecting altered state/intoxication), eyes-closing (e.g. biometric signs of sleepiness), monitor vital signs like pulse and respiratory rate, detect facial expressions (e.g., to detect mood/behavior) and the like.

Returning to FIG. 2A, the processor 110 and/or the camera 145 can also be communicatively coupled to one or more light or signal emitters (not shown) for illuminating a subject during image capture, for example, visible light, infra-red or near-infra-red light emitters and the like.

Audio output 155 is also operatively connected to the processor 110. Audio output can be any type of speaker system that is configured to play electronic audio files as would be understood by those skilled in the art. Audio output can be integrated into the mobile device 101 or external to the mobile device 101. In addition, the mobile device can also include one or more microphones 104 for capturing audio recordings as would be understood by those skilled in the art.

Various additional hardware devices/sensors 160 can also be operatively connected to the processor. The sensors 160 can include: an on-board clock to track time of day, etc.; a GPS enabled device to determine a location of the mobile device; an accelerometer to track the orientation and acceleration of the device or associated vehicle; gravity magnetometer; proximity sensors; RF radiation sensors, temperature gauges and other such sensors that are commonly found in mobile devices, on-board computers for vehicles, as would be understood by those skilled in the art.

Communication interface 150 is also operatively connected to the processor 110 and can be any interface that enables communication between the mobile device 101*a* and external devices, machines and/or elements including system server 105. Preferably, communication interface includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the mobile device to other computing devices and/or communication networks such as private networks and the Internet. Such connections can include a wired connection or a wireless connection (e.g. using the 802.11 standard) though it should be understood that communication interface can be practically any interface that enables communication to/from the mobile device.

FIG. 2E is a block diagram illustrating an exemplary configuration of system server 105. System server 105 can include a processor 210 which is operatively connected to various hardware and software components that serve to enable operation of the system for facilitating secure authentication of transactions at a terminal 100. The processor 210 serves to execute instructions to perform various operations relating to user authentication and transaction processing as will be described in greater detail below. The processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more software programs or applications (referred to as the "secure authentication server application") comprising instructions in the form of code that is executable by the processor 210 can be encoded in the storage 290 and/or in the memory 220. For example, the server application can include software modules 130 (depicted in FIG. 2B) and the modules 130 can execute entirely on the system server 105 as a stand-alone software package, partly on the system server 105 and partly on a remote computing device, such as a remote computing device 102, mobile device 101a and/or user computing device 101b, or entirely on such remote computing devices.

Also preferably stored on the storage 290 is a database 280. As will be described in greater detail below, the database 280 contains and/or maintains various data items and elements that are utilized throughout the various operations of the system 100, including but not limited to, user profiles as will be described in greater detail herein. It should be noted that although the database 280 is depicted as being configured locally to the computing device 205, in certain implementations the database 280 and/or various of the data elements stored therein can be stored on a computer readable memory or storage medium that is located remotely and connected to the system server 105 through a network (not shown), in a manner known to those of ordinary skill in the art.

A communication interface 255 is also operatively connected to the processor 210. The communication interface 255 can be any interface that enables communication between the system server 105 and external devices, machines and/or elements. In certain implementations, the communication interface 255 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device 205 to other computing devices and/or communication networks, such as private networks and the Internet. Such connections can include a wired connection or a wireless connection (e.g., using the 802.11 standard) though it should be understood that communication interface 255 can be practically any interface that enables communication to/from the processor 210.

The operation of the system for authorizing access to a vehicle and the various elements and components described above will be further appreciated with reference to the method for authenticating a user as described below, in conjunction with FIGS. 3-4 with continued reference to FIGS. 1 and 2A-2C, 5A-5C.

Figure 3:
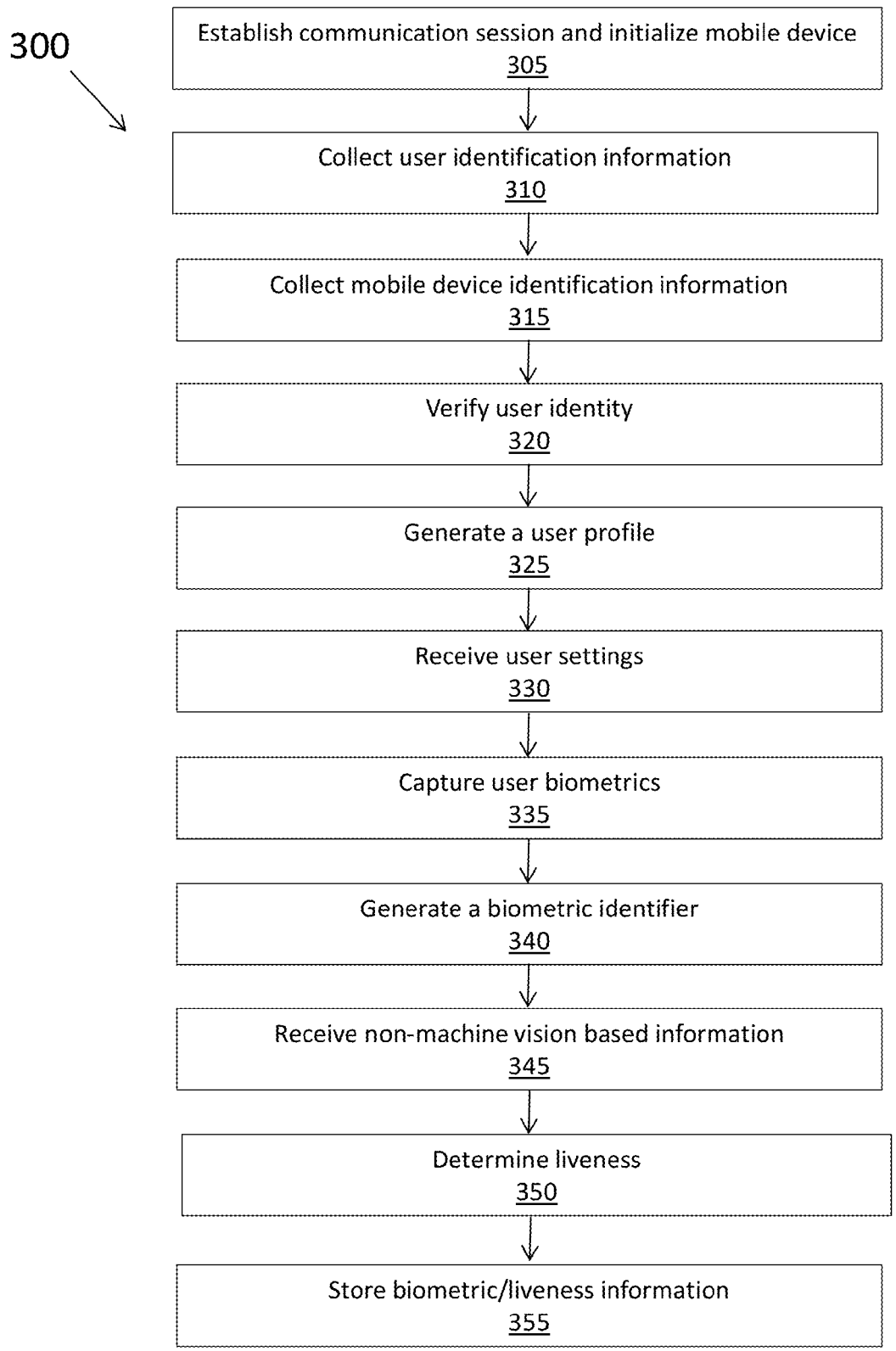
FIG. 3 is a flow diagram showing a routine for enrolling a user using an on-board vehicle computer in accordance with at least one embodiment disclosed herein.
Figure 4:
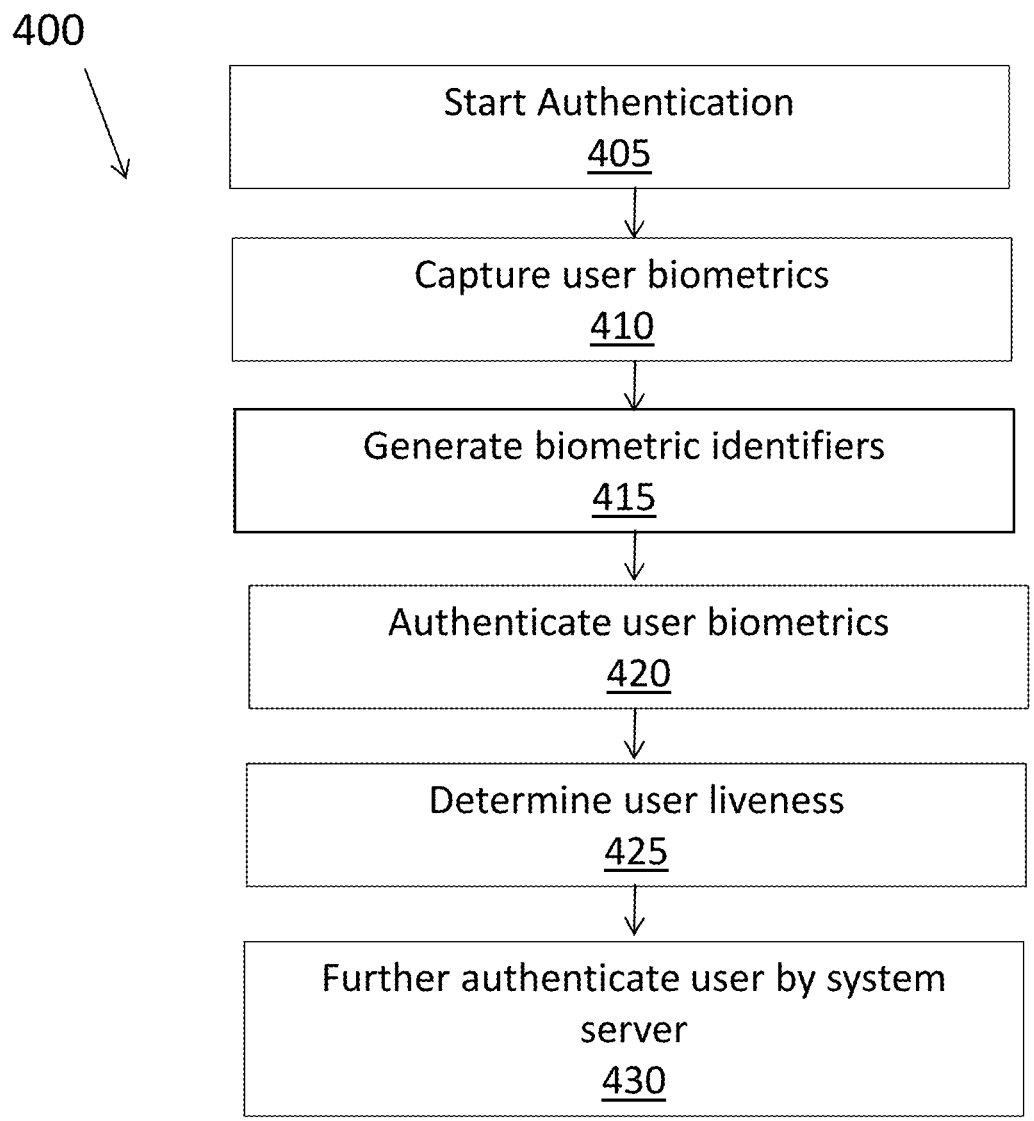
FIG. 4 is a flow diagram showing a routine for authorizing a user to access a vehicle based on the user's biometric features in accordance with at least one embodiment disclosed herein.

The processes depicted in FIGS. 3 and 4 are described from the perspective of the on-board computer 101b as well as the system server 105, however, it should be understood that the processes can similarly be performed, in whole or in part, using the mobile device 101a or any combination of the foregoing.

FIG. 3 is a flow diagram illustrating a routine 400 for enrolling the user 124 with the system 100. The enrollment process verifies the user's identity to ensure that the user is who they say they are. Enrollment also specifies the manner in which the user 124 and/or the user device that is being used to authenticate the user (e.g., on-board computer 101b and/or or on-board device 101b) is identified to the system server 105 during authentication processes. In addition, enrollment can create a user profile which associates the user 124 with user devices (e.g., user's mobile device 101a and/or the on-board computer 101b) and with one or more of the user's transaction accounts (i.e., a vehicle access and vehicle management account such as an On-Star®, or a fleet vehicle management service maintained by the remote computing device 102). Enrollment also includes capturing (e.g., reading) the user's biometrics features, generating one or more biometric identifiers characterizing those features and determining the user's liveness. These steps can be performed for verification as well as to establish a baseline for future verification sessions as further described herein. Accordingly, it can be appreciated that many of the steps discussed in relation to FIG. 3 can be performed during subsequent user authentication sessions as discussed in relation to FIG. 4.

The process begins at step 305, where an initial communication session is established between the on-board computer 101b and the system server 105. In some implementations, communications between the on-board-computer and system server can be established using 2-way Secure Socket Layers (SSL) established on a top of 1-way SSL communication. More specifically, the processor 110, which is configured by executing one or more software applications, including, preferably, the communication module 182 and the enrollment module 176, can transmit an API call to the system server 105 and establish a 1-way SSL communication session with the system server 105 in order to encrypt the communications. The API call can also include a private 2-way SSL key so as to establish a 2-way SSL secure communication environment. In some implementations, the on-board-computer can transmit a pre-loaded 2-way SSL certificate and an API key that is unique to the on-board-computer client application. The pre-loaded certificate and key can be single use instances that are stored when the client application is stored into memory.

Figure 6A:
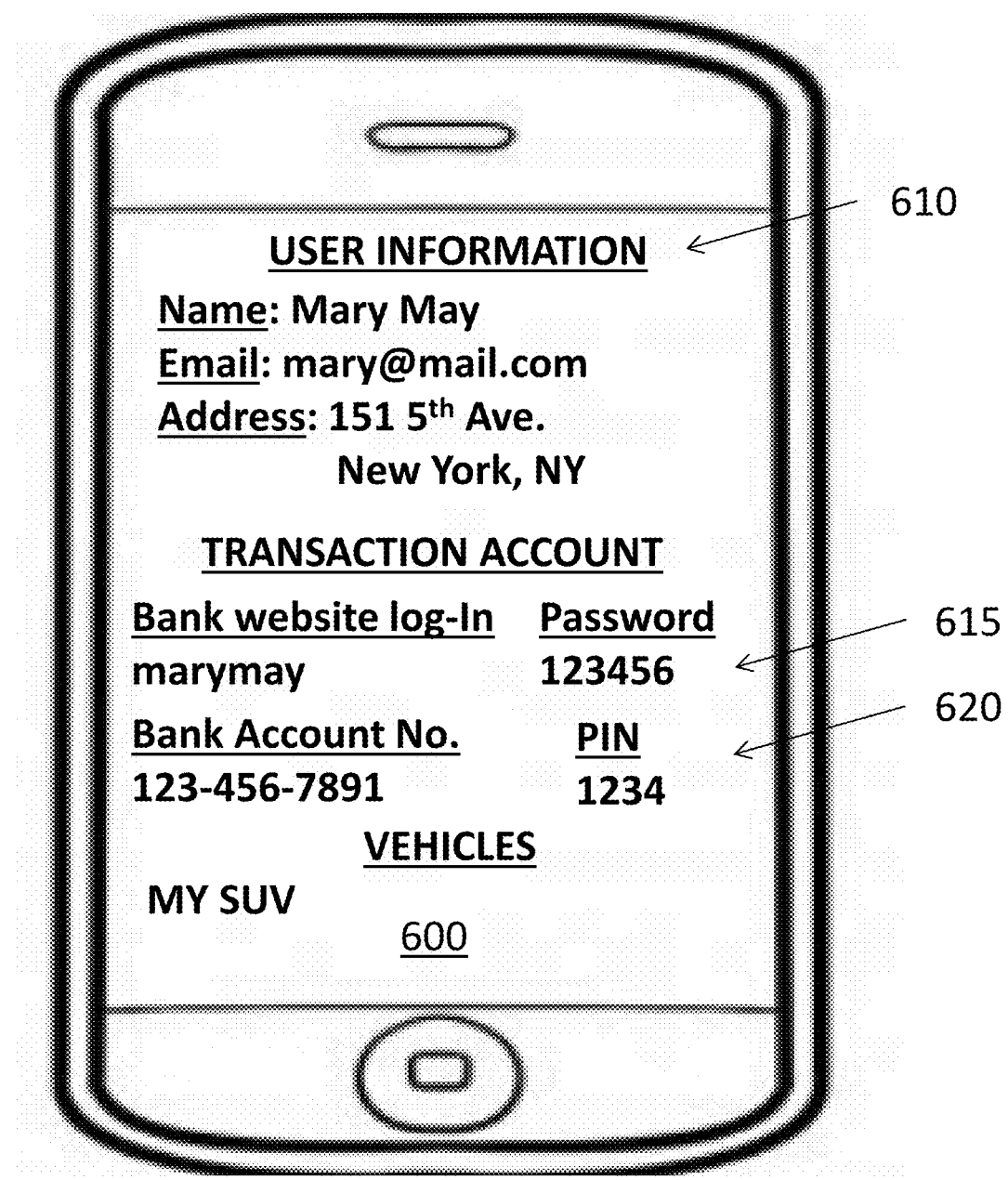
FIG. 6A is a screenshot of an exemplary user interface in accordance with at least one embodiment disclosed herein.

Then at step 310, the on-board computer 101b collects user identification information. More specifically, the processor 110, which is configured by executing one or more software modules 130, including, preferably, the enrollment module 176 and the user interface module 170, can prompt the user to input the user identification information and receive the user inputs via the user interface 115. The user identification information can include information about the user's identity (e.g., name, address, social security number, etc.). For example, as shown in FIG. 6A, the on-board device display 600 can prompt the user to input such personal information about the user's identity 610. In some implementations, some or all of the information can be gathered automatically from memory of the on-board computer 101b or from another computing device. For example, the user information can be provided from another enrolled user device such as mobile device 101a or automatically obtained from an existing user profile associated with the user that is maintained by the system server 105 or the remote computing device 102.

In addition, user identification information can include information about one or more transaction accounts with which the user can access or interact with the vehicle as further described herein. For example, the user can enter pre-existing log-in and passwords 615 associated with the user's various transaction accounts. In some implementations, the configured processor and/or the system server 105 can automatically obtain some or all of such information directly from the enterprise organizations associated with the transaction accounts and/or ACEs after verifying the user's identity according to the user identification information provided by the user.

Then at step 315, device identification information is collected. Device identification information can include but is not limited to at least a portion of the DeviceID, AndroidID, IMEI, CPU serial number, GPU serial number and other such identifiers that are unique to the on-board computer 101b. More specifically, the processor 110, which is configured by executing one or more software modules 130, including, preferably, the enrollment module 176, can query the various hardware and software components of the on-board-computer 101b to obtain respective device identification information.

Then at step 320, the user's identity is verified. Identity verification provides additional security and determines that the user 124 is, in fact, who they claim to be. It should be understood that verifying the user's identity can be performed by the system server 105, the on-board computer 101b, or a combination of the foregoing.

It should be understood that the stringency of the identity verification can vary depending on the level of security as dictated by the particular implementation of the secure authentication system 100. For example, user log-in to an online forum/discussion board might require only liberal verification of a user's identity, whereas applications in which the disclosed systems and methods are used to authenticate a financial transaction may require stringent identity validation.

Then at step 325, if a user's identity is verified, a user profile can be generated and stored. The user profile can include one or more pieces of user identification information and device identification information. In addition the user profile can include information concerning one or more of the user's transaction accounts as well as settings that can be used to guide the operation of the system 100 according to the user's preferences.

In some implementations, the system server 105 can generate a unique identifier for the user (a "userId") and an associated device identifier (a "mobileId") and store the identifiers in a clustered persistent environment so as to create the profile for the user. The userId and mobileId can be generated using one or more pieces of the user identification information and device identification information, respectively. It should be understood that additional user identification information and device identification information can also be stored to create the user profile or stored in association with the user profile.

In addition, the userId and associated mobileId can be stored in association with information concerning one or more transaction accounts described at step 315. In some implementations, the specific transaction account information can be stored on the system server 105 thereby enabling the system server to authorize all or part of the requested transactions on behalf of the user and the enterprise organization. In addition or alternatively, the user profile can be associated with a transaction account using, for example, an identifier (e.g., a site ID or global unique identifier, etc.) or other such pointer to a secure datastore storing the sensitive transaction account information, say, the remote computing device 102 operated by an enterprise organization. Accordingly, the system server 105 is not required to store sensitive transaction account information, and, as further described herein, the system server 105 can generate and/or forward requests to authorize a user to the appropriate enterprise organization for further processing. In addition or alternatively, the system server can query the secure datastore to gather the necessary information for processing any such requests.

At this juncture, it can be appreciated that the userId can be used to map the user profile to the user's legacy transaction accounts. In addition, the mobileId ties the device to a user profile. In some implementations, the userIds are a convention, whereas, the mobileIds are mandatory because the mobileId alone can link the user 124 and on-board-computer 101b pair to the user profile maintained by the system server 105 and/or the user's transaction accounts. Moreover, any additional information included in the user profile can be used for non-repudiation or provenance purposes by the system server 105 in future authorization requests.

It can be appreciated that user profiles can be created by the system server 105 and/or the on-board-computer 101b. Moreover, one or more instances of a user profile can be stored on various devices (e.g., system server 105, mobile device 101a, remote computing device 102, or user computing device 101b). In addition, the information included in the various instances of the user's profiles can vary from device to device. For example, an instance of the user profile which stored on the on-board-computer 101b can include the userId, mobileId, user identification information and sensitive information concerning the user's transaction accounts, say, account numbers and the like. By way of further example, the instance of the user profile stored by the system server 105 can include the userId, mobileId, other unique identifiers assigned to the user and information that identifies the user's transaction accounts but does not include sensitive account information.

In some implementations, generating the user profile by the system server 105 can also include generating a private key. In some implementations, the private key can be a unique 2-way SSL certificate. The key can be generated by the system server 105 or, in addition or alternatively, the on-board computer 101b. In some implementations, the key can be generated using one or more of the user identification information, which can include the information concerning the user's transaction account(s), and the device identification information. In the case of generating the private key by the system server 105, the generated private key can also be transmitted back to the on-board-computer 101b for storage in the device. Accordingly, the generated key can be used for subsequent communications in conjunction with identity assertion sessions.

For example, the enrollment/genesis phase can establish an instance of the enrolled user in persistent storage by linking the information that identifies the user (e.g., userId, SSN, email, or other user identifiers) to a Common Name (CN), which can be the particular manner in which the particular user is uniquely identified by the system server 105 and/or legacy transaction account systems in the two way secure socket layers key. Accordingly, the genesis phase can also link legacy transaction accounts associated with the user (e.g., the user's bank account) with the user identity maintained by the system server 105.

The private key (generated on the system server 105 and/or the on-board computer 101b or mobile device 101a) and links the particular user device (e.g., mobileId) and user (e.g., userId) pair to the user identity (e.g., user identifier, common name, etc.) that will be used for subsequent communication.

In some implementations, the identity as asserted through the 2-way Secure Socket Layer key can be maintained for all communication. This key can be encoded with a password known to only the device being used during enrollment, which in this example is the on-board computer 101b. In addition, the key is programmatically placed in the key store on the on-board computer 101b. It is the only mechanism allowing the identity and links to the genesis phases. Preferably, no human or device knows the password used to encrypt the 2-way SSL key. Accordingly, the on-board computer 101b, using the private key, has an identity to offer in subsequent communications. It can be appreciated that each enabled device associated with a user can have a unique key that can be linked to the same user profile enabling the use of multiple devices in the same manner, for example mobile device 101a and on-board computer 101b. In addition or alternatively, separate user profiles can be established and maintained for each user-device pair independently or in a linked fashion. It can also be appreciated that, similarly, multiple users can use the same device(s) which correspond to individual user profiles or joint user profiles or otherwise linked user profiles. For example, a particular vehicle can be shared by any number of approved users, accordingly, the on-board computer 101b associated with the vehicle can be linked to each of the approved users during respective genesis phases. As further described herein, access-control and management can define a hierarchy of users and associated roles and rules concerning respective user's access to the vehicle, (e.g., access to features/functionality monitored/controlled by the on-board computer 101b alone or in conjunction with one or more remote devices such as system server 105 and remote computing device 102).

Accordingly, as a result of genesis/enrollment, a user profile is created which associates the user 124 to the user's enrolled devices. In addition, genesis serves to provide the on-board computer 101b with information (e.g., a unique user identifier and device identifier and/or unique keys) for identifying the user 124 and/or on-board computer 101b in subsequent communications with the system server 105, say, identity assertion sessions for authenticating and/or authorizing a user.

Further, the enrollment can link the user profile to one or more stored records of the vehicle and transaction accounts associated with the vehicle and/or users. Accordingly, the stored vehicle record or vehicle profile can link to an associated vehicle management account/service as well as to one or more enrolled users. For instance, owners of the vehicle who are authorized to configure the settings relating to the vehicle use, authorized operators of the vehicle and the like.

It can be appreciated that the server can manage storage of such information in a server index maintained in a computer-readable storage medium. The index can include inventory entries that are used to record information about the users of the system (e.g., user profile information). Inventory entries can also be created that include information concerning the vehicle itself (e.g., deviceID associated with the on-board computer, vehicle identifier, associated management account information and the like). Inventory entries can also include information about subsequent transactions involving the vehicle, for example, instances of user access, details concerning the usage of the vehicle and the like. In this manner, inventory entries can be updated or appended to previous inventory entries or otherwise associated/linked in memory thereby creating an index that provides a comprehensive audit trail for each user interacting with the system and/or vehicle accessed using the system. In addition, inventory entries can also reflect access rules and permissions defined by a user relating to a car. For instance, the index can be updated by the system server to reflect the link between authorized user profiles and the vehicle and further reflect the access rules and permissions associated with users and/or the vehicle. Additionally, when a user's access to a vehicle is revoked or changed, the inventory entry(ies) associated with that vehicle and the specific user(s) can also be erased from the server index or otherwise modified to reflect the revocation/update of access.

Then at step 330, user settings are received. Settings include preferences and rules defined by the user for guiding the operation of the system 100. In some implementations, during the enrollment process or at any point thereafter, the on-board computer 101b (or other enrolled user computing device) can prompt the user to input settings and associate those settings with the user profile and/or the vehicle profile. The settings can be stored by the on-board computer or the system server 105 or a combination of the foregoing.

In some implementations, the user input settings can specify preferred situations in with which the user is authorized using the system. For example, the user desires to be biometrically authenticated only prior to accessing a vehicle in the morning, as opposed to re-authenticating after accessing the vehicle during the course of the day. Similarly, settings can specify certain features and functions that are performed automatically upon authorizing a user to access a vehicle. Similarly settings can define preferences concerning the various access-controlled environments that the user desires to access using the system. For example, settings can identify certain subscription based services that the user wishes to automatically access using the system 100 after being provided access to the vehicle. In some implementations the settings can specify circumstances in which a user desires to authenticate for gaining access to other access-controlled environments.

In some implementations, the user settings can include user defined access rules controlling access to the vehicle by one or more other users. For example, a vehicle owner can define rules concerning access and use by of the owner's child. By way of further example, a manager of a fleet of vehicles can define which user's access which vehicles in the fleet and provide usage restrictions and other such rules that relate to the use of the vehicle. User settings can also include privacy settings governing how information associated with the various users, the user's activity and use of the vehicle is stored and/or shared. For example, the settings can identify other devices, enrolled users or enterprise organizations that have access to the information that is gathered by the system and the terms of the access to the information.

In some implementations, the user settings can specify preferences for conducting transactions with other access-controlled environments while utilizing the vehicle. For example and without limitation, the user can specify default payment methods/accounts thereby configuring the on-board-computer 101b and/or the system server 105 to process transactions efficiently while the user is driving the vehicle. In addition, the user can associate the payment methods with specified merchants. By way of further example, a user can specify rules to control use of the vehicle, say, causing the system server 105 to prevent certain types of transactions from being performed while the vehicle is being used, cause a notification to be provided to the owner or implement additional security measures to ensure approved account usage.

It should be understood that the described settings are presented as non-limiting examples and, as further described herein, a wide variety of settings can be used to control the operation of the system and how users interact with the system.

It should be also understood that during enrollment and any time thereafter and while using any user devices (e.g., mobile device 101a and on-board computer 101b) that are enrolled with the system, the user can adjust settings regarding user's preferences for interacting with the system 100. For example, the device can receive from the user additional user identification information, passwords, transaction account information and the like for storage locally on the mobile device 101a, on the system server 105, the on-board computer 101b or a combination of the foregoing. As such, any of the computing devices of the system 100 can be configured to act as a platform for automatically facilitating access to ACEs using such transaction accounts and providing the user's information to the various enabled computing devices (e.g., mobile device 101a, user computing device 101b, remote computing device 102) to provide the access.

Then at step 335, the user's biometrics features are captured using the on-board computer 101b. In some implementations, the processor 110, which is configured by executing one or more software modules 130, including, preferably, the enrollment module 176, the analysis module 174, the user interface module 170, and the capture module 172, prompts the user to capture imagery of one or more of the user's iris/irises, eye(s), periocular region, face and finger(s), and the like, using the camera 145 coupled to the processor 110 and stores one or more images to storage 190 or memory 120.

Then at step 340, one or more biometric identifiers are generated from the captured biometric information and are stored to complete the enrolment stage. More specifically, the processor 110, which is configured by executing one or more software modules 130, including, preferably, the capture module 172, the database module 178, the analysis module 174, can analyze the biometric information captured by the camera and generate a biometric identifier.

In some implementations, the biometric identifiers can be stored locally on the on-board-computer 101b in association with the user's profile such that the mobile device can perform biometric authentication according to the biometric identifiers. In addition or alternatively, the biometric identifiers can be stored in association with the user's profile on a remote computing device (e.g., system server 105 or remote computing device 102) enabling those devices to perform biometric authentication of the user.

At step 345, the processor 110, which is configured by executing one or more software modules 130, including, preferably, the capture module 172, can also receive non-machine-vision based information. Non-machine-vision based information generally relates to behavioral characteristics of the user 124 during enrollment and subsequent authentication sessions and subsequent interaction with the system 100 that are indicative of the user's preferences, identity as well as the user's liveness. For example and without limitation, non-machine-vision based information can include a time received from an on-board clock, a location received from GPS device, how far from the user's face the camera is positioned during image capture calculated from imagery or other on-board proximity measuring devices, the orientation of the device and acceleration of the device received from an accelerometer, RF radiation detected by an RF detector, gravity magnetometers which detect the Earth's magnetic field to determine the 3-dimensional orientation in which the device is being held, light sensors which measure light intensity levels and the like.

In some implementations, the non-machine-vision based information is received over time and stored such that the configured processor can determine patterns in the information that are unique to the user 124 by applying behavioral algorithms as would be understood by those in the art. Accordingly, during later authentication stages, the current non-computer-vision based data collected can be analyzed and compared to the user's established behavioral traits to verify the user's identity as well as determine whether the information is indicative of liveness. For example, time and location based behavioral patterns can be identified over time and the current position compared to the pattern to determine if any abnormal behavior is exhibited. By way of further example, the device orientation or distance from the user's face can also be similarly compared. By way of further example, an RF radiation signature for the user can be established during enrollment and compared to future measurements to identify abnormal RF radiation levels (e.g., suggesting the use of video screens to spoof the system). The non-machine vision based information as measured using the device, as user information gathered from one or more other enrolled user devices or recorded during the course of the user's interaction with the device, for instance, while using an enrolled device or accessing a vehicle, can also be used to determine behavioral traits and preferences of the user concerning the user's use of the system.

At step 350, the processor 110 which is configured by executing one or more software modules 130, including, preferably, the analysis module 174, can determine the user's liveness. Determining liveness can include generating one or more liveness identifiers which characterize the captured user's biometrics and/or the non-machine-vision based information that are indicative of the user's liveness. As noted above, determining liveness is an anti-spoofing measure that can be performed during enrollment and subsequent authentication sessions to ensure that the image sequence captured by the imaging device is of a live subject and not a visual representation of the user by, say, a high resolution video. In some implementations liveness is determined by detecting movement of biometric features because every time the user enrolls or validates the user will actually move a little no matter how steady he/she is trying to be.

Then at step 355, the one or more biometric identifiers and/or liveness information or behavioral information are stored. In some implementations, the processor 110, which is configured by executing one or more software modules 130, including, preferably, the enrollment module 176 and the database module 178, can store the biometric identifiers locally, so as to perform biometric authentication on the on-board computer 101a, thereby avoiding transmission of the sensitive biometric information to the system server 105 for storage.

In some implementations, the configured processor can transmit the biometric identifiers, liveness identifiers and other information generated/captured during enrollment and thereafter to the system server 105 as one or more data packets. It should be understood that additional user and mobile device specific information (e.g., user identification information or identity assertion keys), can also be transmitted to the system server so as to associate the user information with a particular user.

Exemplary systems and methods for capturing biometric information, generating biometric identifiers, performing biometric-based authentication and determining liveness are further described herein and in co-pending and commonly assigned "SYSTEM AND METHOD FOR GENERATING A BIOMETRIC IDENTIFIER" filed on Mar. 7, 2014; U.S. patent application Ser. No. 14/276,753; U.S. Patent Application Ser. No. 62/041,803, entitled "SYSTEMS AND METHODS FOR DETERMINING LIVENESS" filed Aug. 26, 2014; U.S. Patent Application Ser. No. 62/041,964; U.S. Provisional Patent Application Ser. No. 62/112,961, entitled "SYSTEMS AND METHODS FOR PERFORMING FINGERPRINT BASED USER AUTHENTICATION USING IMAGERY CAPTURED USING MOBILE DEVICES" filed Feb. 6, 2015; U.S. Patent Application Ser. No. 62/129,246 titled SYSTEM AND METHODS FOR BIOMETRICS BASED USER IDENTIFICATION, filed on Mar. 6, 2015; U.S. Patent Application Ser. No. 62/129,277, entitled "SYSTEMS AND METHODS FOR PERFORMING IRIS IDENTIFICATION AND VERIFICATION USING MOBILE DEVICES" filed Mar. 6, 2015;

It should be understood that some or all of the enrollment process steps can be repeated using other user devices, e.g., mobile device 101a. For example, the user can enroll with other user devices for use in conjunction with the system 100, thereby enabling user authentication, authorization and interaction with the system 100 using multiple enrolled user devices.

Turning now to FIG. 4, which is a flow diagram that illustrates a routine 400 for authorizing a user to access a vehicle in accordance with at least one embodiment disclosed herein.

The process begins at step 405 where the on-board computer 101b is prompted to authenticate the user 124. In some implementations, the on-board computer is prompted to authenticate by receiving a user input. For example, as shown in FIG. 5C, the vehicle can include a user interface (e.g., a button 115a located on the exterior of the car) that is communicatively coupled to the processor 110 and that is accessible to the user from the outside of the vehicle. Accordingly, a user input via the button can cause the processor 110 to initiate the authentication process. In some implementations, the on-board computer 101b can begin the authentication process automatically (e.g., without proactive user input). For example, the processor can be configured to, using an associated proximity sensor, detect when a user is approaching the driver's side of the vehicle or standing near to the vehicle and begin authentication in response to the detection.

In some implementations, the on-board computer 101b can receive a user authentication request from another computing device, for instance, the system server 105. For example, the system server can initiate the authentication process in response to receiving an authentication request from a remote computing device. Preferably, the authorization request includes access-control information that identifies the particular vehicle, thereby enabling the system server 105 to cause the appropriate on-board computer 101b to commence user authentication. By way of example and without limitation, the authorization request can be received by the system server directly from a remote computing device 102 that serves to facilitate user access to the vehicle and other services relating to the use of the vehicle (e.g., a vehicle access management system that controls electronic vehicle door locks, vehicle operation features or otherwise provides subscription based services to the user via the on-board computer 101b and other enrolled user computing devices). By way of further example, the enrolled user mobile device 101a can be used to initiate authentication by transmitting a request to the system server 105 or directly to the on-board computer. More specifically, the mobile device 101a can be configured to provide a list of devices/ACEs (e.g., vehicles) that a user is authorized to access, such that the user can select the particular vehicle. In response the mobile device can initiate authentication, either by directly transmitting the request to the on-board computer 101b or indirectly transmitting the request via system server 105 or remote computing device 102.

Then at step 410, the processor 110, which is configured by executing one or more software modules, including, the authentication module 180, the user interface module 170, the analysis module 174 and the capture module 172, captures the user's current biometric information. In addition, the configured processor can also capture current non-machine-vision based information for authentication and liveness detection purposes. The capture of such information can be performed by the device as described in relation to FIG. 3.

Then at step 415, the processor 110, which is configured by executing one or more software modules, including, the authentication module 180 and the analysis module 174, generates one or more current biometric identifiers, for example, as described in relation to FIG. 3.

Then at step 420, the user is biometrically authenticated according to the one or more current biometric identifiers. Using the current biometric identifiers, the user's identity can be authenticated by comparing the biometric identifiers to one or more stored biometric identifiers that were previously generated during the enrollment process or subsequent authentication sessions.

In addition, at step 425, the user can be further authenticated by verifying the user's liveness. In some implementations, liveness of the user can be determined by comparing at least current liveness information with the previously generated liveness information and determining whether the liveness information matches to a requisite degree. As noted above, verifying the user's liveness can also include analyzing the captured biometric and non-machine-vision information and/or liveness identifier(s) to determine whether they exhibit characteristics of a live subject to a prescribed certainty.

Then, at step 440, the user is authorized by the system server 105. Authorization can include verifying that an enrolled user who has been biometrically authenticated using an enrolled on-board computer 101b is attempting to access the vehicle.

In some implementations, the processor 110, which is configured by executing one or more software modules 130, including preferably, the authentication module 180 and the communication module 182, can generate at least one authentication request and transmit the authentication request to the system server 105. For example and without limitation, the transaction request can include: information identifying the user (e.g., user identification information or a user identifier generated during authentication or enrollment); information identifying the on-board computer 101b (e.g., deviceID or an identifier generated during enrollment for the device); information indicating whether the user has been biometrically authenticated. The request can also include access information that relates to the vehicle that the user is attempting to access. Access information can include an identifier for the vehicle with which the system server can identify the vehicle being accessed. This identifier can be provided inherently as a function of transmitting information identifying the on-board computer 101b, however it can also be provided separately, for instance in the case the user is requesting access to the vehicle using a mobile device 101a. Access information can also include the nature of the access requested. In other words, an operation or function that pertains to the vehicle and that user desires to perform, for instance, unlock the door, start the car, adjust the temperature or other vehicle settings, access satellite radio, contact On-star services, order and pay for food while driving the car, modify the access rules and permissions that control how the vehicle is used and by whom.

In some implementations, the transaction request can include a private 2-way SSL key generated during the enrollment process and that establishes a 2-way SSL secured communication session between the on-board computer 101b and the system server 105. The key can include information identifying the user and device, for example, a user identifier and a mobile device identifier. In addition or alternatively, the key can include information that is useable to identify the user-mobile device pair. It should be understood that the transaction request and/or the information included in the transaction request(s) can be transmitted as a number of separate transmissions. Similarly, the processing of the request as further described at step 445 can be performed in any number of steps by the mobile device 101a, or the system server 105, or the remote computing device 102, or a combination of the foregoing.

In response to receipt of the transaction request, the system server 105, using a processor 210 which is configured by executing one or more software modules 130, can process the transaction request to validate the user authentication and, in addition or alternatively, authorize the user to access the vehicle. For example, the system server can cross-reference the user identified in the transaction request with a database of user profiles to determine whether the user is associated with a user profile and, hence, is enrolled with the system 100. Likewise, the system server can determine whether the device being used by the user to authenticate is associated with the user profile. In some implementations, the user can be authorized by comparing the received key to one or more keys stored in association with respective user profiles to identify a match, thereby verifying that the user and/or on-board computer identified by the key corresponds to a user profile stored in the database.

In addition, the step of authorizing the user can also include determining, by the system server, whether the authorization request indicates that the user has been biometrically authenticated using the user device (e.g., mobile device 101a or on-board computer 101b and the like). In some implementations, verifying biometric authentication can include determining whether the transaction request conforms to a predetermined configuration. For example, the on-board computer can be configured to access the identity assertion key, which was generated during enrollment of the user using the particular on-board computer 101b, upon successful biometric authentication. Accordingly, the on-board computer can be configured to generate the transaction request including the key only upon successful biometric authentication of the user. Moreover, transmission of the transaction request to the system server 105 including the key can provide confirmation that the user has been biometrically authenticated using the on-board computer. By way of further example, the transaction request can include additional indicators, flags, session information and the like which indicate that the user has been biometrically authenticated and can also provide additional security to the authenticity of the transmission.

Similarly, it should be understood that all transmissions to and from the various computing devices (e.g., mobile device 101a, user computing device 101b system server 105, and remote computing device 102) during user authentication and subsequent communications can be time stamped and time sensitive and/or include session information. As such, the authorization process can also be contingent upon authentication occurring within a pre-defined duration or "time to live" from the time-stamp of each packet of data being sent to the system server. In the event of a malformed or MITM (man in the middle) type assault, where a packet was redesigned, the time-to-live provides additional security since it would be challenging to rebuild a new packet with correct data within the amount of time the TTL is set to.

Authorization can also include determining, by the system server 105, whether the user has permission to "access" the vehicle as requested (i.e., perform one or more operations or "transactions" relating to the vehicle). Preferably, during user authorization process, the system server 105 receives access information identifying the vehicle. For example, in the scenario where the on-board computer 101b automatically initiates authentication and provides, in the authorization request, information identifying the on-board computer, the system server 105 can identify the particular vehicle profile associated with the identified on-board computer. By way of further example, in the scenario where mobile device 101a is being used to access the vehicle, the system server can receive a vehicle identifier and identify the appropriate vehicle record in the storage accordingly.

Moreover, based on the identified vehicle and the user identified by the authorization request, the system server 105 can determine whether the user has the requisite permissions to access the vehicle. For example, the system server can query one or more access rules and permissions that are linked to the user profile and the vehicle profile and determine, based on the access rules, whether the requesting user is authorized to access the vehicle.

As previously noted, in some implementations, the authorization request received by the system server 105 can include access information describing the nature of the requested user access. Accordingly, user authorization by the system server 105 can include further determining whether the user has the requisite permissions to perform the particular operation. More specifically, the system server 105 can query one or more defined data stores to gather any access rules (e.g., access permissions, roles, settings etc.) which govern access to the particular vehicle. The system server can also determine whether any of the access rules/permissions concern the particular user profile. Based on the so gathered access rules, the system server can determine whether the user is authorized to perform the particular transaction/operation provided in the requested transaction.

Then at step 445, an authorization notification is generated according to whether the user is authorized at step 440. In some implementation, the system server 105 can transmit the authorization notification directly to the on-board computer 101b associated with the vehicle that the user is requesting access to. In some implementations, the authorization notification can be transmitted indirectly via one or more other computing devices. For example, the authorization notification can be transmitted to a mobile device 101a that is being used by the user to access the vehicle. By way of further example, the authorization notification can be transmitted to a remote computing device 102 that controls access to the vehicle and therefore requires the user authorization (e.g., a networked computing device that in conjunction with the on-board computer 101b controls an electronic door lock providing access to the vehicle, or provides subscription based services to the vehicle, say, provides music services via the on-board device, and therefore requires user authorization prior to providing such services). By way of further example, the authorization notification can be transmitted to the mobile device 101a or the user computing device 101b with which the user is attempting to gain access to the vehicle. Based on the authorization notification, the remote computing device which receives the authorization notification can facilitate access to the user and/or further authorize the user to access the vehicle and/or process the requested transaction.

The substance and form of the authorization notification can vary depending on the particular implementation of the system 100. In some implementations the notification transmitted to a remote vehicle management system (e.g., computing device 102) can identify the user and indicate that the user been biometrically authenticated and/or also authorized. The remote device can authorize the user and transmit an instruction to the on-board computer 101b to provide access by say, unlocking the door or otherwise performing the authorized operation. Similarly, the system server can be configured to transmit such an instruction to provide the access directly to the on-board computer.

In addition or alternatively, the notification can include information concerning one or more transaction accounts, say, the user's log-in and password information or a one-time password that are useable to gain access to an access controlled environment. Accordingly, the on-board computer can utilize the received information to provide the requested access using the received account information. In other instances, say, when user is trying to complete a financial transaction while operating the vehicle, the notification can be transmitted directly to a third-party payment processor (e.g., computing device 102) to complete the transaction.

In the case of a user/owner of a vehicle requesting that the access rules be updated to allow a friend to drive the vehicle, the system server can, upon authorizing the owner and identifying the user profile associated with the friend, modify the corresponding index entries to reflect that the friend is permitted to use the vehicle. As a result, the system server can provide an authorization notification to the owner's computing device confirming the change to the access rules. In addition, the system server can transmit a notification to the friend's enrolled computing device informing the friend of the updated permissions and providing related information. In some implementations, the friend can thereafter request access to the vehicle using the friend's mobile device. After authorization of the friend by the system server, an instruction can be sent to the on-board computing device to provide the access. In addition or alternatively, the notification provided to the friend's mobile device can also include an electronic key that is useable to access the vehicle. For instance, by transmitting the key to the on-board computing device. The electronic key can be, for example, a one-time authorization key generated by the system server and linked to the friend's user profile and the vehicle profile. The key can be protected/encrypted by a unique password that is also generated and stored by the system server during key generation. Accordingly, the key can only be utilized by the friend after the system server provides the password to the friend's mobile device, which occurs only after successful biometric authentication and authorization of the friend.

The systems and methods for authorizing access to a vehicle are not limited in any way to the illustrated embodiments and/or arrangements as the illustrated embodiments and/or arrangements described are merely exemplary of the systems and methods disclosed herein, which can be embodied in various forms, as appreciated by one skilled in the art. Some alternative embodiments, arrangements and exemplary applications include the following exemplary embodiments.

As previously noted, the systems and methods disclosed herein provide the infrastructure to configure a car to be owner aware. More specifically, the on-board computer 101b can identify the owner by name and face. In addition, through monitoring access to the vehicle and the user activity while using the vehicle, the on-board computer can learn user habits, for instance, what the owner wants to do, where the owner wants to go. The machine learning can be further informed by integration of the on-board computer with other user devices and networked systems and services associated with the user. Accordingly, through machine learning, the system for authorizing the user access to the vehicle can also provide additional assistance and services to aid the user in his daily life. Moreover, the systems and methods disclosed herein and the exemplary architecture are further configured to ensuring secure communications between the on-board computer 101b and other proximate and remote computing devices during operation.

Furthermore, using a variety of strategically placed cameras inside and outside the car, the exemplary systems and methods can link the owner with the car and other computing devices coupled to the on-board computer. Further described herein are some exemplary uses and configurations of the disclosed systems and methods for providing authenticated access to vehicles. In this example, through machine learning, user "Joe's" car (i.e., the on-board computer 101b) knows his habits, where he likes to go, what he likes to eat, and what he like to hear, in sum, is Joe Aware. This provided using a system application "app" executing on his smartphone that configures the smartphone to perform biometric authentication and monitoring, and through integration of the smartphone with a similar implementation of the app on the on-board computer of his car.

For instance, Joe activates his Android or iPhone and launches the system app. The application initiates, and prompts him to authenticate for access. For example audibly announcing "Welcome, please authenticate for Access" and, in response to Joe's glance at his smartphone, biometrically authenticates Joe, as previously described. Upon authentication the device can report authentication for example, by announcing over a speaker "Authentication Granted . . . Welcome back Joe." Upon authentication the application configures the device to provide various actionable choices, for instance, vehicle-related actions such as start his car, or actions relating to his day such as, choose his daily routine and the like. In response to a choice of "Start the car," and "set the temperature to 70 F, the smartphone relays the selected operations to the system server 105 which can further authorize the requested operations, for example, based on access rules associated with Joe and his car. Upon granting access, information received from the on-board computer and associated sensors concerning the status of the vehicle can also be provided to Joe via his smartphone. For example, a flashing yellow light on the app interface can indicate the fuel level and based on one or more rules provide a warning "out of gas." In the event of such a warning, the system can prompt Joe to take one or more actions, for instance, "add a gas station to your route." By choosing such an action, the system can be configured to, using one or more mapping services automatically choose the closest gas station on the route to his next appointment (determined from his calendar) and based on his current location. As Joe physically approaches the car door the on-board computer can, using an associated exterior facing camera, e.g., camera 145a of FIG. 5C, identify, authenticate and authorize Joe's physical access and unlock the door of the car automatically. In addition, using imagery captured by another camera in the dash behind the steering wheel (e.g., camera 145b of FIG. 5A), the on-board computer can detect when Joe sits down in the driver's seat.

Upon biometrically detecting Joe as having sat down, the on-board computer can also be configured to provide Joe with information and notifications based on user settings/preferences associated with Joe's user profile. For instance, the on-board computer can retrieve information concerning the weather from a weather service and announce the weather forecast. By way of further example, the on-board computer can be integrated with one or more other user computing devices e.g., Joe's smartphone to retrieve voice-messages and download the messages to local storage. Similarly the on-board computer can be integrated with one or more enterprise account servers, for instance, an email server and pre-download the unread emails based on the user profile settings.

Accordingly, upon receiving a verbal instruction from Joe to play voicemails, as detected by the on-board computer using an associated microphone and speech recognition software, unlike traditional voicemail systems (in which users have to press numbers to access the messages and deal with a cumbersome IVR), the on-board computer has already downloaded the messages and other such information to internal storage based on the stored preferences. Accordingly, the messages simply start to play. Integration with other devices and subscription services also allows for other operations to be performed seamlessly based on the preferences of a biometrically identified/authorized user such as dialing telephone calls, video chat session, accessing music libraries (both local and cloud based) and the like.

It can be appreciated that the systems and methods for biometric identification and monitoring can be embedded into the vehicle's on-board computer as well as into an enabled smartphone in communication therewith (e.g., via wireless communication) or a combination of the foregoing. Accordingly, distributed parts of the system can be connected via the GSM/LTE wireless data network. In order for the car to locate Joe, it preferably has cameras built into the car itself. One camera might be located strategically in the driver dash, hidden from sight. The cameras are not expensive, they can be small CMOS sensors with, for example, 5-16 Mega Pixels of resolution. Other cameras might be placed in the passenger locations so that passengers can be detected as well.

In addition, through ongoing collection of data relating to the user, machine learning algorithms, behavioral analysis algorithms and the like can be implemented to analyze biometric information, user activity while using the car, vehicle data and user activity on associated devices to identify characteristic features of the user. These can include characteristic biometric features, characteristics of the user's behavior, habits and the like, as well as characteristics of the surrounding environment. Accordingly, the system for providing biometric access can identify the user and "learn" user characteristics that can be recorded in memory (e.g., in association with a user profile) and can automatically guide operation of the system thereby improving operation of the system and providing the user uniquely tailored experiences and services.

Joe can "enroll" his entire family, in his system app, and define various settings relating to himself and other enrolled users/occupants of the car, for instance, setting their ages. Access rules/permissions relating to each enrolled user can also be defined by the owner (i.e., administrator) of a vehicle, and/or be pre-defined. Accordingly, the system can, based on the profiles and rules/permissions, determine that Sally, who is only 6 years old, should not be allowed to sit in the front seat with the car moving and can restrict operation of the vehicle by one or more of the users until the rules are complied with. Other similar safety related considerations can be monitored and enforced using the system.

As noted, other cameras can be located outside the car, in the doorframe itself. Upon detecting by the on-board computer using these cameras Joe approaching the car, the doors can automatically unlock and the on-board computer can automatically adjust various vehicle related settings according to the settings provided in the user profile, like temperature, seat setting, and the like.

The disclosed embodiments also provide an infrastructure with which vehicle owners can share access to a vehicle. For example, if an owner would like to lend the vehicle to a friend. The friend can download the system App on his mobile device and register. The owner can define settings that identify the friend and the vehicle, which prompts the system server 105 to generate an encrypted key and send the encrypted key to the friend's mobile device that can only be used through biometric authentication performed using his mobile device. In addition, the owner can set parameters that the guest driver can be required to adhere to in order to access and use the car.

Owner defined access rules for other users can include geo-fencing & security enhancements. For instance, Joe can define restrictions for his 18 year old son Billy's use of the car, say, the car may never exceed 55 mph, and Billy is not allowed to drive with friends, or go outside of a 5 mile radius from Joe's house. These and many other parameters can be defined by the owner and recorded by the system and enforced. The conditions relating to the parameters can be automatically enforced based on, biometric authentication and authorization of Billy and information received from on-board sensors that provide usage information while Billy is granted access (e.g., using) the car. For instance, the on-board sensors can identify the number of occupants and prevent the vehicle from being driven by Billy when occupants are detected within the car or report the breach of the access rules to Joe.

In the event that a user attempts to access a vehicle and authorized access is not granted, say, if the access rules associated with the particular user and vehicle do not permit the requested access (e.g., the vehicle is beyond the geo-fence, or it is too late to drive the vehicle) the owner or administrator can be notified of the authorization attempt and information concerning the user and the vehicle. For example, a picture of the user's face captured by the on-board computer, the user's name (if known), a location of the vehicle and the like can be included in the notification. In addition, the owner can be prompted to provide consent to the requested access. For instance, the owner's enrolled smartphone can prompt the owner to accept/reject whether the user is authorized to access and confirm the selection with biometric authentication. Upon authorized confirmation, the system server can instruct the on-board computer to provide access.

The systems and methods disclosed herein also provide additional features relating to driver awareness. The exemplary biometric monitoring enabled on-board computer systems can also be configured to capture biometric information of the user(s), analyze the biometric information to detect physical condition of the users, for instance, when a driver or passenger is ill, sleepy, or intoxicated. The incorporated biometric authentication systems and methods can also detect the Respiratory Rate and Heart Rate of one or more drivers and passengers. Similarly visual imagery using various camera types can detect the number of passengers in a car. The biometric monitoring information can also be used to generate various health and safety related alerts for the users, owners and other monitoring services as well as control operation of the vehicle according to pre-defined settings. The information collected by the on-board computer during use of the vehicle can be stored locally and/or on a remote device such as the system server.

More specifically, a thermal IR camera can be used to capture thermal imagery of one or more occupants of the vehicle. Using the thermal imagery the on-board device processor can detect core body temperature. Accordingly, the on-board computer can adjust the interior temperature of the vehicle accordingly to compensate for elevated temperature. Moreover, thermal imagery can be used as the basis for detecting physical conditions such as illness (e.g., high body temperature). It can also be used to detect the number of passengers in the vehicle.

Visible light or NIR and IR cameras can be used to monitor pupil dilation, for instance to detect altered state/intoxication of the driver. Similarly monitoring facial features from such imagery can also detect the driver's eyes-closing, which can be interpreted by the computing device as biometric evidence of sleepiness. For example, on-board computer can be configured to analyze the image sequence captured by the interior to identify facial gestures captured in the image sequence. For example, the method for detecting eye closing can include identifying features (e.g., one or both eyes depicted in the images, eyelids, eyebrows) and can then detect and analyze transitions between a sequence of images as they relate to the position/orientation of the landmarks. Using any detected transitions, the computer can detect facial gestures such as a blink, prolonged blink, and the like by comparing the detected transitions to characteristic landmark transitions associated with the user's facial gesture to be detected. Facial expressions and body movement can be similarly detected and analyzed.

A user pulse and/or respiratory rate can also be detected using Visible, NIR or IR imaging devices. These and other measured biometric traits and vital signs of the driver or other identified passengers can be captured and analyzed in view of baseline readings for each of the known occupants or other expected characteristics to detect physical conditions, mood and abnormal behavior. Detection of abnormal conditions by the on-board computer can prompt the system to automatically generate alerts or execute other actions that enhance the experience of the vehicle occupants or implement safety precautions.

By way of further example, the disclosed monitoring and access control system can be configured to ensure that no child (or biological creature) is left behind in a car. More specifically, one or more cameras (regular or thermal imaging) that are internally positioned, say, on the rear view mirror, can collect imagery. The imagery can be analyzed by the on-board computer to detect the presence of occupants in the vehicle. In addition the on-board computer can be configured to positively identify the occupants (e.g., identify the child and determine the age based on stored information) or distinguish between children, adults or animals (e.g., based size and/or shape). Pre-defined rules or safety settings can further provide that children should not be allowed to remain in a vehicle after the vehicle is parked without an adult present. Accordingly, the on-board computing device can detect a child left behind in the vehicle and take responsive action such as, preventing doors from closing or locking or sounding the car alarm until the child is removed or sending a notification to the user, vehicle owner or the authorities.

Safety monitoring based on biometric information can also be performed in view of environmental conditions detected by the computing device. For instance, information received from external cameras, position sensors, proximity sensors, accelerometers, on-board diagnostic (OBD) sensors and the like can be used to detect traffic congestion. Paired with abnormal biometric readings, such as elevated pulse, facial expressions indicative of stress, the on-board computer can automatically perform operations to alleviate the stress, such as play soothing music, provide a notification to the user reminding the user to remain calm, re-route the vehicle, automatically adjust the user's schedule, notify others accordingly and the like.

The monitoring system can also be configured to detect the occurrence of emergency situations and take responsive action. For instance, upon detecting the occurrence of an accident, the on-board computer can transmit a notification to the system server providing real-time information concerning the occupants including the number of occupants of the vehicle, vital signs of one or more of the occupants. Similarly the on-board computer and/or system server can further relay the accident and real-time vehicle/occupant information, or previously stored information concerning the use of the vehicle, to an emergency response system.

In addition, in the event that the on-board computer detects driver vital signs that are indicative of an emergency while the vehicle is in motion (e.g., heart attack, or driver unconscious, asleep) the on-board computer can slow the vehicle to a stop, turn on hazard lights and automatically call a preset number or 911 with a prerecord voice message including a current location of car and information relating to the incident.

As previously noted, the systems and methods disclosed herein also facilitate conducting transactions using the on-board computer or other configured user devices. For example, the on-board computing device can automatically identify a gas-station that a user is pumping gas at (based on location, or an identifier or a unique code received by the on-board computer from the gas pump) and, after the user completes pumping gas, can automatically conduct a payment transaction for the gas using a payment account associated with the authorized user's profile. By way of further example, say Joe is driving and wants to purchase food. No need to stop, take out his phone, find a location to eat, or try to access the old style navigation HMI interface found in cars of today. Instead, Joe can simply ask the on-board computer where the nearest restaurant is. Upon locating the restaurant using the mapping service, the waypoint can be added to the route by the on-board computer. As the vehicle proceeds to access the menu for the restaurant and present the Menu to Joe and Joe can select an item. Upon completion of the selection, the on-board computer can be configured to automatically conduct the payment transaction to complete the purchase. This can include optically scanning his face, biometrically authorizing Joe, identifying a transaction account associated with Joe's user profile (e.g, his Google Wallet, Amazon or PayPal account) and process the order and transaction with the restaurants online order processing system. Joe pulls up to the drive through, where the attendant has already completed his order. She also sees a picture of Joe on her point of sale terminal (this was relayed as part of the transaction).

In accordance with the disclosed embodiments, the exemplary systems and methods are configured to perform the actions listed in the following table 1:

| Safety | Security | Convenience |
|---|---|---|
| NOD (Nodding Off Detection) - Warning alarm sounds when system detects eyes closing | Protecting your GPS locations especially your home | OnStar integration, using exemplary systems and methods for biometric monitoring Online Purchasing of Goods or Services without Credit Card |
| IMED (Imminent Medical Emergency Detection) - car slows to a stop, turns on hazard lights and automatically calls a preset number or 911 with prerecord end voice message including current location of car | Secure access to opening the Vehicle Ignition tied to user identity Authorize other Drivers Preset times when other Drivers can lock/unlock/start car (i.e. teenagers) Remotely start engine (heat/cool car) | Route Prediction Points of Interest offering and prediction Calendar events Recalculated search results based on interests |
| Altered State or Intoxication Detection | Always locate car Remotely view other passengers in car | Mood Detection - The car will know what kind of mood you are in or if there is a social situation (i.e. a Date, etc.) and can set the internal lights/music to accommodate. |
| Blocking handheld phone usage, in-automobile by utilizing biometric monitoring Vision Pattern Matching capabilities. | | Always locate car Enhanced ZipCar Model |
| Exemplary systems and methods for biometric monitoring and methods and Medical Scanner transfer to phone (When vehicle is diabled) - Remote transmission of vitals to emergency dispatch | | Car can detect if you are alone in the car and offer to "Keep you company" by playing a music playlist or asking you trivia questions, etc. |
| Prevent unauthorized/underage drivers | | |
| Prevent "after hours" use (Teenage Drivers) | | |
| Road Rage Prevention - The car will know you are in heavy traffic, it will hear car horns going off and see your mood and offer sounds/music/words of comfort to calm you down. | | |
| Bad Weather detection - The car can tell you if the weather is too bad to drive in. | | |

It can be appreciated that in some implementations, the system server 105 can also maintain a history of a user's authorizations using the system including any and all of the information collected, and/or processed during the exemplary biometric authentication and authorization processes and thereafter. For example, records and details concerning access to vehicles, and transaction or operations performed relating to the user access can be stored by the system server in one or more databases, thereby creating a transactional audit trail for the user. It should be understood that information concerning any and all access requests, transactions and activity can be stored by the system server 105.

For example, a record relating to a user's authorized use of a vehicle, which can include GPS and other such physical location data and other data collected during the use (e.g., pictures, sensor measurements, time), can be stored by the system server 105, thereby creating a physical audit trail of the user. In addition, the user can be periodically authenticated or prompted to authenticated simply for the purpose of recording the user's personal location in an authenticated manner. For instance, settings associated with a commercial driver and his truck can require that the driver is automatically authenticated by the on-board computer periodically throughout the day to ensure the authorized driver is driving and to monitor how long and how far the driver is driving, so as to comply with legal requirements. Based on the settings, automatic alerts for the driver and administrators can be generated by the on-board computer and/or system server regarding driver compliance. In addition, as described above, the use of the vehicle can be controlled to ensure compliance with the rules/settings.

The stored physical and transactional audit trails can be accessible to the user and other authorized users/administrators via respective computing devices. For example, using a dashboard-like interface presented by an enrolled mobile device 101a or computing device executing the secure authentication application or through a web-based user interface. Using the dashboard, a user can adjust settings, preferences and specify access rules for the audit trails. For example, the user 124 can review and specify other individuals and organizations who are authorized to have access to the user's audit trail data, or specific portions of the audit trails. In addition, the user can grant conditional access to the specified organization/person according to the user's terms, including but not limited to, use restrictions and cost.

In some implementations, the user's GPS location information can be gathered by the user's mobile device 101a or any other GPS enabled computing devices (e.g., on-board computer 101*b*) that are associated with the user and/or a vehicle accessed by the user in accordance with the disclosed embodiments. The usage and location information can be stored by the system server 105 on one or more associated datastores. For example, a GPS enabled computing device 101*b* can be located in the user's vehicle and collect GPS location information about the car's location. The location information can be transmitted to the system server 105 or directly to a database so as to maintain a physical audit trail of GPS data for the car and computing device 101*b*.

By way of further example in some implementations, the system server 105 can also control access to/usage of the computing device 101*b* and/or an associated ACE (e.g., the vehicle), in accordance with the disclosed embodiments. For example, by requiring biometric authentication/user authorization before providing access to the computing device or vehicle or otherwise restricting access.

Location data can be used for a number of purposes, by example and without limitation, tracking the movement of fleet vehicles, monitoring usage, tracking stolen vehicles and the like. Accordingly, it can be appreciated that in some instances it is desirable to monitor and share the location information collected by the computing device 101*b* and the associated vehicle. However, in view of privacy concerns, users might not want the location to be tracked unless necessary. In view of such privacy concerns, in some implementations, the user 124 can specify, rules defining the extent that the location information of, say, the computing device 101*b*, or a mobile device 101*a* or other computing devices (e.g., a dedicated vehicle location tracking device) should be collected or made available for monitoring by individuals/enterprise systems. For example, the user 124 can specify that they do not wish to share the user's location information that is collected while the user is in the vehicle, but desires the location to be monitored while the user is not in the car (e.g., for vehicle theft tracking purposes). By way of further example, if managing a fleet of cars and employees, a user 124 can specify that they wish to track the location of a vehicle including computing device 101*b*, when an employee is in the car.

In some implementations, when the computing device 101*b* is interacted with (e.g., activated by a user, someone starts the car causing the computing device 101*b* to begin collecting location information and the like), the computing device can scan the user's biometrics and biometrically authenticate the user in accordance with the disclosed embodiments. In addition or alternatively the computing device 101*b* can transmit an authorization request to the system server 105. The authorization request can identify the computing device 101*b* and can also include additional information, say, a GPS location of the computing device, an identity of the user, etc. In response to the request, the system server can determine, from the received information and stored user profiles, that the computing device 101*b* is associated with a user 124 and prompt an associated mobile device 101*a* to authenticate the user. By way of further example, if multiple users have access to the vehicle having a tracking device (e.g., computing device 101*b*) the user can be required to identify themselves to the computing device 101*b* for authorization either before or after accessing the vehicle. Accordingly, the authentication request can identify the particular user, such that the system server can prompt the appropriate user's mobile device 101*a* is to biometrically authenticate the user. In addition or alternatively, the system server 105 can notify all approved users such that the appropriate user can continue authentication. In addition or alternatively, based on the location of the computing device 101*b*, the system server can identify an enrolled mobile device having a corresponding location and prompt the associated user to authenticate.

In some implementations, the user can initiate the authentication process using the computing device 101*b* and/or the user's mobile device 101*a*. For example, when the user gets into a car having computing device 101*b* the user can initiate the authentication process such that the user's location is not tracked by mobile device 101*a* or computing device 101*b*. In addition or alternatively, the user can be required to authenticate before being permitted to access/activate the car associated with the computing device 101*b* (e.g., start the car).

Provided the user's identity is authenticated, the system server 105 can grant access to the ACE (e.g., the computing device, the car and the like) or collect/provide access to the information recorded by those devices in accordance with the access rules associated with the user 124, the mobile device 101*a*, the computing device 101*b*, the ACE and the like. For example, if the user's preferences specify that the user's location information can be accessed by a spouse but should not be shared with a theft monitoring company, the system server 105 can grant access to the spouse and deny access to the theft tracking company. By way of further example, if an owner of a car specifies in the settings associated with the computing device 101*b* that a particular user has access to the car between 8 AM and 11 PM and that the location should be continuously monitored while in use by the particular user, the system server can permit, upon successful authentication/authorization, the particular user to access the car during the specified time window, can continuously monitor the location while in use, and can also provide access to the location information to the owner.

At this juncture, it should be noted that although much of the foregoing description has been directed to systems and methods for authorizing a user to access a vehicle according to the user's biometric features, the systems and methods disclosed herein can be similarly deployed and/or implemented in scenarios, situations, and settings far beyond the referenced scenarios.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Similarly combination of system components, such as software modules, in a particular component should not be understood as requiring such combination in all embodiments, and it should be understood that the components and corresponding features/functionality can be implemented across one or more separate components.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for authorizing a user to access a vehicle. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed:

1. A method for authorizing a user to access a vehicle, the method comprising:
    accessing, by a remote server computing device, a non-transitory computer readable storage medium, and wherein information stored in the storage medium includes:
        a plurality of user profiles, wherein each user profile is associated with a respective user and a respective mobile device,
        a plurality of vehicle profiles, wherein each vehicle profile is associated with a respective vehicle having a respective on-board computer, and
        permissions associated with respective user profiles in relation to respective vehicle profiles, wherein the permissions govern access by the respective users to the respective vehicles;
    receiving an authorization request in the form of one or more message received by the computing device over a network from one or more of the user's personal mobile device and the vehicle's on-board computer, the authorization request comprising: identification information associated with the user, access information identifying the vehicle and a biometric authentication status generated by one or more of the mobile device and the on-board computer;
    authorizing, by the computing device based on the received at least one authorization request, the user access to the vehicle, wherein the authorizing step comprises:
        determining, by the computing device, that the received identification information corresponds to a user profile among the plurality of user profiles stored in the storage,
        determining, by the computing device, that the identified vehicle corresponds to a vehicle profile among the plurality of vehicle profile stored in the storage,
        determining, by the computing device based on the received biometric authentication status, that the user has been biometrically authenticated using one or more of the mobile device and the on-board computer,
        identifying, based on the identification information and the access information, one or more permissions, among the permissions, that is associated with the user and the vehicle, and
        verifying, based on the one or more permissions, that the user is authorized to access the vehicle;
    transmitting, based on the authorization, by the computing device over a communications network to a remote computing device associated with the vehicle, an authorization notification that facilitates the user access to the vehicle.

2. The method of claim 1, further comprising:
    creating, by the computing device in the storage, an access record concerning the authorized access;
    receiving, by the computing device from the on-board computer, usage information relating to the user's authorized access to the vehicle; and
    updating the access record based on the usage information.

3. The method of claim 2, further comprising:
receiving, by the computing device from the on-board computer, a notification that an accident involving the vehicle occurred during the authorized access; and
transmitting, by the computing device to a remote computing device associated with an emergency response agency, at least a portion of the record including the number of occupants of the vehicle.

4. The method of claim 2, further comprising: receiving, by the computing device from the on-board computer during the authorized access, a subsequent authorization request comprising identification information associated with the user and the on-board computer, a biometric authentication status, and information identifying the vehicle; repeating the authorizing step based on the subsequent authorization request and the usage information, wherein the step of verifying comprises analyzing the usage information based on the one or more permissions; and transmitting to the remote computing device, based on the re-authorization, an updated authorization notification.

5. The method of claim 1, wherein the remote computing device and the on-board computer are the same device.

6. The method of claim 1, further comprising:
wherein the authorization request specifies an operation to be performed using the on-board computer, wherein the operation is one or more of starting the vehicle, and unlocking a door of the vehicle; and
verifying, based on the one or more permissions, that the user is authorized to perform the operation.

7. The method of claim 6, wherein the authorization notification instructs the on-board computer to provide the user access by performing the operation.

8. The method of claim 1, wherein the identification information s a key that is unique to the user and the mobile device, and wherein determining that the received identification Information corresponds to the user profile comprises matching the received key to a previously stored key that Is associated with the user profile.

9. The method of claim 1, further comprising:
receiving, by the computing device from the on-board computer during the authorized access, a transaction request, the transaction request comprising identification information associated with the user and the on-board computer, a biometric authentication status, and transaction details concerning a transaction to be conducted using the on-board computer,
authorizing, by the computing device based on the received transaction request, the user to conduct the transaction, wherein the authorizing step comprises:
determining, by the computing device, that the received identification information corresponds to a user profile stored in the storage;
identifying, by the computing device, based on the user profile, a transaction account associated with the user profile; and
determining, by the computing device, based on the received biometric authentication status, that the user has been biometrically authenticated by the on-board computer, and
verifying, by the computing device based on the identified transaction account and the transaction details, that the user is authorized to conduct the transaction;
transmitting, by the computing device to the on-board computer based on the authorization, a second authorization notification that advances the transaction via the on-board computer.

10. The method of claim 1, further comprising:
wherein the authorization request includes settings identifying a second user and defining permissions governing access by the second user to the vehicle;
identifying, by the computing device, a second user profile among the user profiles based on the identification of the second user, and
updating, by the computing device, the permissions based on the received settings.

11. The method of claim 10, further comprising:
generating, a vehicle access key;
storing, by the computing device in the memory, at least a portion of the vehicle access key in the memory in association with a second user profile and the vehicle profile associated with the vehicle;
transmitting the vehicle access key to a second user mobile device.

12. The method of claim 11, further comprising:
receiving, by the computing device over the network from the second user mobile device, a second authorization request comprising: identification information associated with the second user and the second user mobile device, a biometric authentication status, the second user key, and access information identifying the vehicle;
authorizing, by the computing device based on the second authorization request, the second user to access the vehicle, wherein the authorizing step comprises:
determining, by the computing device, that the identification information included in the second authorization request corresponds to the second user profile,
determining, by the computing device, that the second user key included in the second authorization request matches the corresponding key associated with the second user profile and the vehicle profile,
determining, by the computing device, based on the biometric authentication status included in the second authorization request, that the second user has been biometrically authenticated by the second user mobile device,
identifying, by the computing device, one or more permissions that are associated with the second user profile and the vehicle profile, and
verifying, by the computing device based on the one or more permissions, that the second user is authorized to access the vehicle; and
transmitting, based on the authorization, by the computing device over the communications network to the on-board computer, an authorization notification that grants the second user access to the vehicle.

13. A system for authorizing a user to access a vehicle, comprising:
a remote server computing device, comprising: a network communication interface, a computer-readable storage medium, and one or more processors configured to interact with the network communication interface and the computer-readable storage medium, and software modules stored on the storage medium and executable by the processor, wherein the software modules include:
a database module that when executed configures the one or more processors to access the storage medium, and wherein information stored in the storage medium includes:
a plurality of user profiles, wherein each user profile is associated with a respective user and a respective mobile device, a plurality of vehicle profiles, wherein each vehicle profile is associated with a respective vehicle having a respective on-board computer, and permissions associated with respective user profiles in relation to respective vehicle profiles, wherein the permissions govern access by the respective users to the respective vehicles;

a communication module that when executed configures the one or more processors to receive, over a network from the user's personal mobile device, an authorization request comprising: identification information associated with a user, a biometric authentication status and access information identifying the vehicle;

an authorization module that when executed configures the one or more processors to, based on the received authorization request, authorize the user access to the vehicle by:

determining that the received identification information corresponds to a user profile among the plurality of user profiles stored in the storage;

determining that the identified vehicle corresponds to a vehicle profile among the plurality of vehicle profiles stored in the storage;

determining based on the received biometric authentication status, that the user has been biometrically authenticated by the mobile device, identifying, by the computing device, one or more permissions, among the permissions, that is associated with the user profile and the vehicle profile, and verifying, by the computing device based on the one or more permissions, that the user is authorized to access the vehicle; and wherein the database module further configures the one or more processors to create, in the storage, an access record concerning the authorized access, and wherein the communication module further configures the one or more processors to transmit, over a communications network to a remote computing device associated with the vehicle, an authorization notification that facilitates the user access to the vehicle.

14. The system of claim 13, wherein the communication module further configures the one or more processors to receive, from the on-board computer, usage information relating to the user's authorized access to the vehicle; and wherein the database module further configures the one or more processors to update the access record based on the usage information.

15. The system of claim 14, wherein the communication module further configures the one or more processors to receive, from the on-board computer, a notification that an accident involving the vehicle occurred during the authorized access, and transmit, to a remote computing device associated with an emergency response agency, at least a portion of the record including the number of occupants of the vehicle.

16. The system of claim 14, further comprising:

wherein the communication module further configures the one or more processor to receive, from the on-board computer during the authorized access, a subsequent authorization request comprising identification information associated with the user and the on-board computer, a biometric authentication status, and information identifying the vehicle; and wherein the authorization module further configures the one or more processors to re-authorize the user based on the subsequent authorization request and the usage information, and wherein the re-authorization verification is performed by analyzing the usage information based on the one or more permissions; and wherein the communication module further configures the one or more processors to transmit to the remote computing device, based on the re-authorization, an updated authorization notification.

17. The system of claim 13, wherein the authorization request specifies an operation to be performed using the on-board computer, wherein the operation is one or more of starting the vehicle, and unlocking a door of the vehicle; and wherein the authorization module further configures the one or more processors to verify, based on the one or more permissions, that the user is authorized to perform the operation and transmit an authorization notification instructing the on-board computer to provide the user access by performing the operation.

18. The system of claim 13, further comprising:

wherein the communication module further configures the one or more processors to receive, from the on-board computer during the authorized access, a transaction request comprising identification information associated with the user, a biometric authentication status, and transaction details concerning a transaction to be conducted using the on-board computer, wherein the authorization module further configures the one or more processors to, based on the received transaction request, authorize the user to conduct the transaction by:

determining that the received identification information corresponds to a user profile stored in the storage;

identifying based on the user profile, a transaction account associated with the user profile; and determining based on the received biometric authentication status, that the user has been biometrically authenticated by the on-board computer, verifying, based on the identified transaction account and the transaction details, that the user is authorized to conduct the transaction, and transmit, to the on-board computer based on the authorization, a second authorization notification that advances the transaction via the on-board computer.

19. The system of claim 13, wherein the authorization request includes settings identifying a second user and defining permissions governing access by the second user to the vehicle, and wherein the one or more processors are configured to, in response to the authorization request including said settings, identify a second user profile among the user profiles based on the identification of the second user and update the second user profile with the permissions defined by the received settings.

20. The system of claim 19, wherein, in response to the authorization request including said settings, the one or more processors are further configured to:

generate a vehicle access key and store at least a portion of the vehicle access key in the memory in association with the second user profile and the vehicle profile associated with the vehicle; and transmit the vehicle access key to a second user mobile device.

21. The system of claim 20, wherein, in response to a second authorization request received from the second user mobile device comprising identification information associated with the second user, a biometric authentication status, the second user key, and access information identifying the vehicle, the authorization module further configures the one or more processors to authorize the second user to access the vehicle by:

determining that the identification information included in the second authorization request corresponds to the second user profile, determining that the second user key included in the second authorization request matches the corresponding key associated with the second user profile and the vehicle profile, determining, based on the biometric authentication status included in the second authorization request, that the second user has been biometrically authenticated by the mobile device, identifying one or more permissions that are associated with the second user profile and the vehicle profile, and verifying, based on the one or more permissions, that the second user is authorized to access the vehicle; and transmitting, based on the authorization, by the computing device over the communications network to the on-board computer, an authorization notification that grants the second user access to the vehicle.

\* \* \* \* \*